US011132898B2

(12) United States Patent
Chopra et al.

(10) Patent No.: US 11,132,898 B2
(45) Date of Patent: Sep. 28, 2021

(54) SYSTEMS AND METHODS FOR SELF-DRIVING VEHICLE TRAFFIC MANAGEMENT

(71) Applicant: Clearpath Robotics Inc., Kitchener (CA)

(72) Inventors: Smriti Chopra, Waterloo (CA); Ryan Christopher Gariepy, Kitchener (CA)

(73) Assignee: Clearpath Robotics Inc., Kitchener (CA)

( * ) Notice: Subject to any disclaimer, the term of this patent is extended or adjusted under 35 U.S.C. 154(b) by 153 days.

(21) Appl. No.: 16/664,054

(22) Filed: Oct. 25, 2019

(65) Prior Publication Data

US 2020/0143675 A1  May 7, 2020

Related U.S. Application Data

(60) Provisional application No. 62/754,511, filed on Nov. 1, 2018.

(51) Int. Cl.
  *G08G 1/0967* (2006.01)
  *B60W 30/18* (2012.01)
  *H04W 4/46* (2018.01)

(52) U.S. Cl.
  CPC ..  *G08G 1/096725* (2013.01); *B60W 30/18009* (2013.01); *G08G 1/096791* (2013.01); *H04W 4/46* (2018.02); *B60W 2554/801* (2020.02); *B60W 2556/65* (2020.02)

(58) Field of Classification Search
  CPC ............................ G08G 1/0967; B60W 30/18; B60W 30/1809; H04W 4/46
  See application file for complete search history.

(56) References Cited

U.S. PATENT DOCUMENTS

2018/0329418 A1*  11/2018  Baalke ................. G05D 1/0246
2020/0097003 A1*  3/2020  Wray ..................... G06N 7/005

* cited by examiner

*Primary Examiner* — Tan Q Nguyen
(74) *Attorney, Agent, or Firm* — Bereskin & Parr LLP/S.E.N.C.R.L., s.r.l.

(57) ABSTRACT

Systems and methods for self-driving vehicle traffic management are disclosed. The system comprises one or more self-driving vehicles. One or more vehicles has a sensor system, a control system, and a drive system. The control system is configured to determine a current position and an intent position associated with itself, and to receive a current position and intent decision associated with a neighbor vehicle. The control system then determines a current spacing and relative spacing between itself and the neighbor vehicle. Based on the current and intent positions, the current spacing, and the relative spacing, the control system determines that the vehicle should yield to the neighbor vehicle, and sends a yield signal to the drive system in order to cause the vehicle to yield to the neighbor vehicle.

20 Claims, 14 Drawing Sheets

SYSTEMS AND METHODS FOR SELF-DRIVING VEHICLE TRAFFIC MANAGEMENT

CROSS-REFERENCE TO RELATED PATENT APPLICATION

This application claims the benefit of U.S. Provisional Application No. 62/754,511, filed on Nov. 1, 2018. The complete disclosure of U.S. Provisional Application No. 62/754,511 is incorporated herein by reference.

TECHNICAL FIELD

The described embodiments relate to the control of self-driving vehicles, and in particular, to systems and methods for self-driving vehicle traffic management.

BACKGROUND

Autonomous vehicles, such as self-driving material-transport vehicles and autonomous cars and trucks are capable of moving from an origin location to a destination location through the use of artificial intelligence and vehicle control systems. Generally, this requires that the autonomous vehicle controls its movement as it travels down a pre-determined path or roadway.

Sensors and control systems on the autonomous vehicle can be used to detect objects along the path or roadway, in order to provide rudimentary collision avoidance, thereby enhancing safety and improving the efficiency with which the vehicle can move down the path or roadway.

However, while these sensors and control system are effective for detecting objects on the path or roadway, problems can arise when the other object is another vehicle that is also operating on the path or roadway, or is transitioning to or from the path or roadway. For example, the two vehicles may be paused indefinitely as they each work independently to re-route themselves around each other, or may stop to wait for one another to pass. As such, there is a need for systems and methods for self-driving vehicle traffic management that recognizes a scenario in which one vehicle may detect the other vehicle, and control itself so as to mitigate these inefficiencies.

SUMMARY

According to a first aspect, there is a method for self-driving vehicle traffic management. The method comprises moving a self-driving vehicle along a path at a first speed and detecting a neighbor vehicle. A processor of the self-driving vehicle is used to determine a current position and an intent position associated with the neighbor vehicle, determine a current position and an intent position associated with the self-driving vehicle, and an intent spacing based on the intent position of the neighbor vehicle and the intent position of the self-driving vehicle. The processor then compares the intent spacing to a distance threshold. Based on determining that the intent spacing is less than (or equal to) the distance threshold, the processor associates a right-of-way status with one of the self-driving vehicle and the neighbor vehicle, and assigns a yield status to the other of the self-driving vehicle and the neighbor vehicle. When the self-driving vehicle is associated with the yield status, the self-driving vehicle is moved along the path at a second speed that is slower than the first speed in response to being associated with the yield status.

According to some embodiments, the method further comprises using the processor to determine a current spacing based on the current position of the self-driving vehicle and the current position of the neighbor vehicle, and a relative spacing of the self-driving vehicle based on the intent position of the self-driving vehicle and the current position of the neighbor vehicle. The processor also determines a relative spacing of the neighbor vehicle based on the current position of the self-driving vehicle and the intent position of the neighbor vehicle. The processor determines the right-of-way status and the yields status based on at least one of the current spacing, the relative spacing of the self-driving vehicle, and the relative spacing of the neighbor vehicle.

According to some embodiments, the method further comprises using the processor to compare the relative spacing of the self-driving vehicle to the current spacing and determine that the relative spacing of the self-driving vehicle is greater than the current spacing, and compare the relative spacing of the neighbor vehicle to the current spacing and determine that the relative spacing of the neighbor vehicle is less than (or equal to) the current spacing. Using the processor to assign the right-of-way status and the yield status comprises assigning the right-of-way status to the self-driving vehicle and assigning the yield status to the neighbor vehicle.

According to some embodiments, the method further comprises using the processor to compare the relative spacing of the self-driving vehicle to the current spacing and determine that the relative spacing of the self-driving vehicle is less than (or equal to) the current spacing, and compare the relative spacing of the neighbor vehicle to the current spacing and determine that the relative spacing of the neighbor vehicle is greater than the current spacing. Using the processor to assign the right-of-way status and the yield status comprises assigning the yield status to the self-driving vehicle and assigning the right-of-way status to the neighbor vehicle.

According to some embodiments, the method further comprises using the processor to compare the relative spacing of the self-driving vehicle to the current spacing and determine that the relative spacing of the self-driving vehicle is less than (or equal to) the current spacing, and compare the relative spacing of the neighbor vehicle to the current spacing and determine that the relative spacing of the neighbor vehicle is less than (or equal to) the current spacing. The processor determines a convergence angle of the self-driving vehicle based on the current position of the self-driving vehicle, the intent position of the self-driving vehicle, and the current position of the neighbor vehicle, and a convergence angle of the neighbor vehicle based on the current position of the self-driving vehicle, the current position of the neighbor vehicle, and the intent position of the neighbor vehicle. Using the processor to assign the right-of-way status and the yield status is based on at least one of the convergence angle and the self-driving vehicle and the convergence angle of the neighbor vehicle.

According to some embodiments, the method further comprises using the processor to compare the convergence angle of the self-driving vehicle to a clearance threshold and determine that the convergence angle of the self-driving vehicle is greater than the clearance threshold, and compare the convergence angle of the neighbor vehicle to the clearance angle threshold and determine that the convergence angle of the neighbor vehicle is less than (or equal to) the clearance threshold. Using the processor to assign the right-of-way status and the yield status comprises assigning the right-of-way status to the self-driving vehicle and assigning the yield status to the neighbor vehicle.

According to some embodiments, the method further comprises using the processor to compare the convergence angle of the self-driving vehicle to a clearance threshold and determine that the convergence angle of the self-driving vehicle is less than (or equal to) the clearance threshold, and compare the convergence angle of the neighbor vehicle to the clearance angle threshold and determine that the convergence angle of the neighbor vehicle is greater than the clearance threshold. Using the processor to assign the right-of-way status and the yield status comprises assigning the yield status to the self-driving vehicle and assigning the right-of-way status to the neighbor vehicle.

According to some embodiments, the method further comprises using the processor to compare the convergence angle of the self-driving vehicle to a clearance threshold and determine that the convergence angle of the self-driving vehicle is greater than the clearance threshold, compare the convergence angle of the neighbor vehicle to the clearance angle threshold and determine that the convergence angle of the neighbor vehicle is greater than the clearance threshold, and compare a difference between the convergence angle of the self-driving vehicle and the convergence angle of the neighbor vehicle to a symmetry threshold and determine that the difference is less than (or equal to) the symmetry threshold. The processor determines that the self-driving vehicle is approaching the neighbor vehicle from a left position based on the current position of the self-driving vehicle and the current position of the neighbor vehicle. Using the processor to assign the right-of-way status and the yield status comprises assigning the right-of-way status of the self-driving vehicle and assigning the yield status to the neighbor vehicle.

According to some embodiments, the method further comprises using the processor to compare the convergence angle of the self-driving vehicle to a clearance threshold and determine that the convergence angle of the self-driving vehicle is greater than the clearance threshold, compare the difference between the convergence angle of the self-driving vehicle and the convergence angle of the neighbor vehicle to a symmetry threshold and determine that the difference is less than (or equal to) the symmetry threshold. The processor determines that the self-driving vehicle is approaching the neighbor vehicle from a right position based on the current position of the self-driving vehicle and the current position of the neighbor vehicle. Using the processor to assign the right-of-way status and the yield status comprises assigning the yield status of the self-driving vehicle and assigning the right-of-way status to the neighbor vehicle.

According to some embodiments, the method further comprise using the processor to compare the convergence angle of the self-driving vehicle to a clearance threshold and determine that the convergence angle of the self-driving vehicle is greater than the clearance threshold, compare the convergence angle of the neighbor vehicle to the clearance angle threshold and determine that the convergence angle of the neighbor vehicle is greater than the clearance threshold, and compare a difference between the convergence angle of the self-driving vehicle and the convergence angle of the neighbor vehicle to a symmetry threshold and determine that the difference is less than (or equal to) the symmetry threshold. The processor determines that the self-driving vehicle is approaching the neighbor vehicle from a left position based on the current position of the self-driving vehicle and the current position of the neighbor vehicle. Using the at least one processor to assign the right-of-way status and the yield status comprises assigning the yield status to the self-driving vehicle and assigning the right-of-way status to the neighbor vehicle.

According to some embodiments, the method further comprises using the processor to compare the convergence angle of the self-driving vehicle to a clearance threshold and determine that the convergence angle of the self-driving vehicle is greater than the clearance threshold, compare the convergence angle of the neighbor vehicle to the clearance angle threshold and determine that the convergence angle of the neighbor vehicle is greater than the clearance threshold, and compare a difference between the convergence angle of the self-driving vehicle and the convergence angle of the neighbor vehicle to a symmetry threshold and determine that the difference is less than (or equal to) the symmetry threshold. The processor determines that the self-driving vehicle is approaching the neighbor vehicle from a right position based on the current position of the self-driving vehicle and the current position of the neighbor vehicle. Using the processor to assign the right-of-way status and the yield status comprises assigning the right-of-way status of the self-driving vehicle and assigning the yield status to the neighbor vehicle.

According to some embodiments, the method further comprises using the processor to compare the convergence angle of the self-driving vehicle to a clearance threshold and determine that the convergence angle of the self-driving vehicle is greater than the clearance threshold, compare the convergence angle of the neighbor vehicle to the clearance angle threshold and determine that the convergence angle of the neighbor vehicle is greater than the clearance threshold, and compare a difference between the convergence angle of the self-driving vehicle and the convergence angle of the neighbor vehicle to a symmetry threshold and determine that the difference is greater than the symmetry threshold. The processor ermines that the self-driving vehicle is approaching the neighbor vehicle from a position above a position of the neighbor vehicle based on the current position of the self-driving vehicle and the current position of the neighbor vehicle. Using the processor to assign the right-of-way status and the yield status comprises assigning the right-of-way status to the self-driving vehicle and assigning the yield status to the neighbor vehicle.

According to some embodiments, the method further comprises using the processor to compare the convergence angle of the self-driving vehicle to a clearance threshold and determine that the convergence angle of the self-driving vehicle is greater than the clearance threshold, compare the convergence angle of the neighbor vehicle to the clearance angle threshold and determine that the convergence angle of the neighbor vehicle is greater than the clearance threshold, and compare a difference between the convergence angle of the self-driving vehicle and the convergence angle of the neighbor vehicle to a symmetry threshold and determine that the difference is greater than the symmetry threshold. The processor determines that the self-driving vehicle is approaching the neighbor vehicle from a position below a position of the neighbor vehicle based on the current position of the self-driving vehicle and the current position of the neighbor vehicle. Using the processor to assign the right-of-way status and the yield status comprises assigning the yield status to the self-driving vehicle and assigning the right-of-way status to the neighbor vehicle.

According to some embodiments, the method further comprises using the processor to compare the convergence angle of the self-driving vehicle to a clearance threshold and determine that the convergence angle of the self-driving vehicle is greater than the clearance threshold, compare the convergence angle of the neighbor vehicle to the clearance angle threshold and determine that the convergence angle of the neighbor vehicle is great than the clearance threshold, and compare a difference between the convergence angle of the self-driving vehicle and the convergence angle of the neighbor vehicle to a symmetry threshold and determine that the difference is greater than the symmetry threshold. The processor determines that the self-driving vehicle is approaching the neighbor vehicle from a position below a position of the neighbor vehicle based on the current position of the self-driving vehicle and the current position of the neighbor vehicle. Using the processor to assign the right-of-way status and the yield status comprises assigning the right-of-way status to the self-driving vehicle and assigning the yield status to the neighbor vehicle.

According to some embodiments, the method further comprises using the processor to compare the convergence angle of the self-driving vehicle to a clearance threshold and determine that the convergence angle of the self-driving vehicle is greater than the clearance threshold, compare the convergence angle of the neighbor vehicle to the clearance angle threshold and determine that the convergence angle of the neighbor vehicle is greater than the clearance threshold, and compare the difference between the convergence angle of the self-driving vehicle and the convergence angle of the neighbor vehicle to a symmetry threshold and determine that the difference is greater than the symmetry threshold. The processor determines that the self-driving vehicle is approaching the neighbor vehicle from a position above a position of the neighbor vehicle based on the current position of the self-driving vehicle and the current position of the neighbor vehicle. Using the processor to assign the right-of-way status and the yield status comprises assigning the yield status to the self-driving vehicle and assigning the right-of-way status of the neighbor vehicle.

According to some embodiments, detecting the neighbor vehicle with the self-driving vehicle comprises using one or more sensors of the self-driving vehicle to obtain a first position of the neighbor vehicle at a first time and a second position of the neighbor vehicle at a second time. Using the processor of the self-driving vehicle to determine the current position and the intent position associated with the neighbor vehicle is based on the first position and the second position.

According to some embodiments, detecting the neighbor vehicle with the self-driving vehicle comprises receiving, using the self-driving vehicle, position data and velocity intent data associated with the neighbor vehicle. Using the processor of the self-driving vehicle to determine the current position and the intent position associated with the neighbor vehicle is based on the position data and velocity intent data associated with the neighbor vehicle.

According to a second aspect, there is a system for self-driving vehicle traffic management. The system comprises a self-driving vehicle having a sensor system, a control system, and a drive system. The control system is configured to determine a current position and an intent position associated with the self-driving vehicle, receive a current position and an intent position associated with a neighbor vehicle, determine a current spacing based on the current position of the self-driving vehicle and the current position of the neighbor vehicle, determine a relative spacing of the self-driving vehicle based on the intent position of the self-driving vehicle and the current position of the neighbor vehicle, determine a relative spacing of the neighbor vehicle based on the current position of the self-driving vehicle and the intent position of the neighbor vehicle, and generate a yield signal based on at least one of the current spacing, the relative spacing of the self-driving vehicle, and the relative spacing of the neighbor vehicle. The drive system is configured to receive the yield signal and vary a speed of the self-driving vehicle in response to the yield signal.

According to some embodiments, the system further comprises a communication network for facilitating communications between the self-driving vehicle and the neighbor vehicle. The control system of the self-driving vehicle configured to receive the current position and the intent position associated with the neighbor vehicle comprises the control system configured to receive position and velocity data transmitted by the neighbor vehicle via the communication network.

According to some embodiments, the system further comprises a fleet-management system in communication with the communication network and each of the self-driving vehicle and the neighbor vehicle. The control system configured to receive position and velocity data transmitted by the neighbor vehicle via the communication network comprises the control system configured to receive position and velocity transmitted by the neighbor vehicle via the fleet management system.

BRIEF DESCRIPTION OF THE DRAWINGS

Several embodiments will now be described in detail with reference to the drawings, in which.

Figure 1:
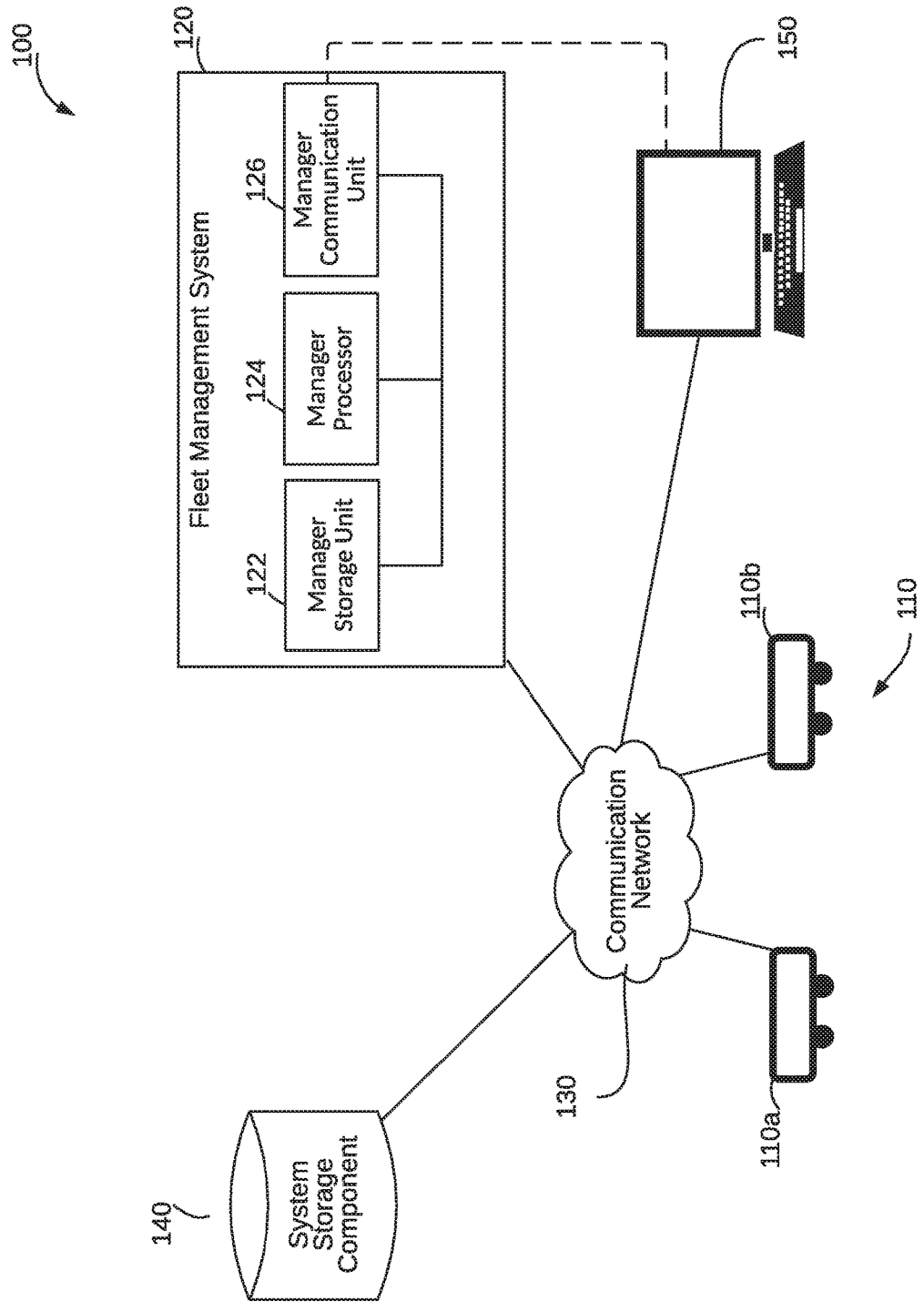
FIG. 1 is a diagram of a system of one or more self-driving vehicles, according to at least one embodiment.

The drawings, described below, are provided for purposes of illustration, and not of limitation, of the embodiments and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

A self-driving vehicle can plan its path to a destination location based at least on its current location and by referring to an electronic map of its environment. The self-driving vehicle can plan its path for conducting a mission or for collecting data from the environment, such as for the purpose of updating an electronic map of its environment. The self-driving vehicle can modify ("replan") its planned path during its operation through a replan operation. For example, the self-driving vehicle can detect an object on its path, and then modify its planned path in order to avoid a collision with the detected object.

As described in more detail here, when a vehicle detects an object on its path, the vehicle can make specific control determinations based on the fact that the detected object is another vehicle specifically. For example, a vehicle may encounter another vehicle in an intersection-type scenario, where the two vehicles are moving towards each other at an angle, or "head on". By understanding that the detected object is another vehicle, and by assuming global rules for determining right-of-way scenarios, the vehicles can achieve enhanced traffic management as compared, for example, to a vehicle encountering an object that is not another vehicle. Generally, two vehicles may be in an interaction scenario whenever they are within a particular proximity of one another. This proximity may be determined in consideration of such things as the size of the vehicles, the footprint of the vehicle (having regard to the size of the vehicle's safety fields that extend beyond the vehicle itself), the normal or maximum operating speeds and accelerations of the vehicles, the type of the vehicles, and the ways in which the vehicles are known to generally be capable of moving.

Two or more self-driving vehicles may communicate with each other using inter-vehicle communications. A first self-driving vehicle can receive information from a second self-driving vehicle that indicates the second self-driving vehicle's position, velocity, and/or intended or planned path. An example of this type of inter-vehicle communication is provided in the applicant's patent application entitled "COMMUNICATIONS SYSTEMS FOR SELF-DRIVING VEHICLES AND METHODS OF PROVIDING THEREOF", filed as U.S. provisional patent application No. 62/627,301 on 7 Feb. 2018; which is hereby incorporated by reference for all purposes.

Similarly, it is possible that a self-driving vehicle may receive information about a second vehicle by communicating with other (e.g. a third, a fourth . . . ) vehicle. For example, a third and/or fourth (etc.) vehicle may obtain information about the second vehicle according to any of the means described here, and then share the information about the second vehicle with the first vehicle. For example, using inter-vehicle communications may allow the self-driving vehicle to obtain information about a neighbor vehicle via inter-vehicle communications with other vehicles (other than the neighbor vehicle).

Similarly, data produced by a global-frame localization system may also be received by a self-driving vehicle in respect of a neighbor vehicle.

Similarly, a self-driving vehicle may be in communication with a factory communication system (e.g. via a communications network and/or fleet management system), which may incorporate any or all of the above-described data streams for transmission to self-driving vehicles.

It is also possible that a first self-driving vehicle can receive information about a second self-driving vehicle without such communications. The first self-driving vehicle can use sensors to detect the position and/or speed of the second self-driving vehicle, and thereby determine the second self-driving vehicle's position and velocity.

By using the received information about the second self-driving vehicle, the first self-driving vehicle can determine whether it has the right-of-way over the second self-driving vehicle, or whether it should yield to the second self-driving vehicle. Similarly, the second self-driving vehicle can determine whether it has a right of way over the first self-driving vehicle based on information about the first self-driving vehicle that the second self-driving vehicle has received, and by applying the same rules for determining right-of-way as the first self-driving vehicle. By extension, the first self-driving vehicle is also able to determine if it does not have the right of way over the second self-driving vehicle, and vice-versa. As a result, the efficiency of traffic management within the described systems and methods can be improved within a fleet of vehicles by coordinating rules for establishing right-of-way, as well within a single vehicle itself through a reduction in the need for path replanning.

Generally speaking, the systems and methods described here may improve the efficiency and efficacy of a fleet of self-driving vehicles. However, the systems and methods can also be regarded in terms of a single self-driving vehicle that is interacting with any other vehicle using the same or similar guidance on right of way. These other vehicle types include but are not limited to cars, trucks, forklifts, industrial tuggers, human-propelled vehicles, and other automatic or autonomous vehicles which are not necessarily communicating using the same protocols as the single self-driving vehicle.

Referring to FIG. 1, there is shown an example system 100 for self-driving vehicle traffic management, having one or more self-driving vehicles 110 (depicted as the self-driving vehicle 110a and the self-driving vehicle 110b). The system 100 can include one or more self-driving vehicles 110, a fleet management system 120, a communication network 130, and a system storage component 140. Although only two self-driving vehicles 110a and 110b are shown in FIG. 1, it is possible for the system 100 to include fewer or more self-driving vehicles 110.

The fleet management system 120 can delegate missions to the self-driving vehicle 110. The missions can be determined by the fleet management system 120, or received at the fleet management system 120 as input data. As shown in FIG. 1, the fleet management system 120 includes a manager storage unit 122, a manager processor 124, and a manager communication interface 126.

The manager storage unit 122 can store data in respect of the operation of the communication system 100, such as data in respect of the self-driving vehicles 110 and the missions being carried out by the self-driving vehicles 110. For example, the manager storage unit 122 can store data received from the self-driving vehicles 110, data in respect of the missions delegated by the fleet management system 120, profile data in respect of each of the self-driving vehicles 110, an electronic map representing the environment in which the self-driving vehicles 110 are operating, etc. The manager storage unit 122 can also store computer programs that are executable by the manager processor 124 to facilitate communication between the fleet management system 120 and the self-driving vehicles 110.

In some embodiments, the manager storage unit 122 can store data that is more current based on the operation of the fleet management system 120, and the system storage component 140 can store data that is considered by the fleet management system 120 to unlikely be used in the immediate future. For example, the manager storage unit 122 can store operating data and vehicle profile data only for the self-driving vehicles 110 operating during a certain day, whereas the system storage component 140 can store the data for all self-driving vehicles 110 and the electronic map of the environment, which is typically infrequently changed.

In some embodiments, the manager storage unit 122 can instead be the system storage component 140, which is accessible via the communication network 130.

The manager processor 124 can control the operation of the fleet management system 120. The manager processor 124 may be any suitable processors, controllers or digital signal processors that can provide sufficient processing power depending on the configuration, purposes and requirements of the fleet management system 120. In some embodiments, the manager processor 124 can include more than one processor with each processor being configured to perform different dedicated tasks. The manager processor 124 together with the processor at the self-driving vehicles 110 contribute to the control of the communication system 100.

The manager communication interface 126 facilitates communication between the fleet management system 120 and the other components of the communication system 100, such as the self-driving vehicles 110 and the system storage component 140 via the communication network 130.

The manager communication interface 126 optionally facilitates communication between the fleet management system 120 and other factory communications systems 150 which are capable of providing and consuming data in the same or similar format such as vehicle positioning data and vehicle intent. As indicated by the dashed line, the factory communications system 150 may be in communication with the communications network 130 and/or directly with the manager communication interface 126. According to some embodiments, the term "fleet management system" may refer to fleet management system 120 exclusively or inclusively of the factory communications system 150.

The self-driving vehicles 110 and the fleet management system 120 may communicate via the communication network 130.

The communication network 130 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between the fleet management system 120, the self-driving vehicles 110 and the system storage component 140.

For example, each self-driving vehicle 110 and the fleet management system 120 may be equipped with a wireless communication interface to enable wireless communications according to a Wi-Fi protocol (e.g. IEEE 802.11 protocol or similar). According to some embodiments, the communication network 130 may be a LAN, WWAN, and/or cellular network, for example, using a 3G/4G protocol.

Similar to the manager storage unit 122, the system storage component 140 can store information about the self-driving vehicles 110, including operating data, and electronic maps of the environment within which the self-driving vehicles 110 operate. Electronic maps can be stored in the system storage component 140 for subsequent retrieval by the self-driving vehicles 110. The self-driving vehicles 110 can download electronic maps from the system storage component 140 via the communication network 130, for example.

Electronic maps can be generated for the environment of the self-driving vehicles 110. For example, a CAD file representing the environment of the self-driving vehicles 110 can be imported and form the basis for an electronic map. In another example, the fleet management system 120 can generate the electronic map based on data collected by the self-driving vehicle 110.

In some embodiments, operating data can be stored in the system storage component 140, and the operating data can be retrieved by the fleet management system 120 when needed. The fleet management system 120 can download the operating data from the system storage component 140 via the communication network 130. Example operating data can include, but is not limited to, a current position of the self-driving vehicle 110, a current velocity of the self-driving vehicle 110, an estimated position for the self-driving vehicle 110 at a subsequent time (e.g. an intent position), an estimated completion time of a current mission of the self-driving vehicle 110, and an estimated remaining battery lifetime of the self-driving vehicle 110. In some embodiments, the operating data, or at least some of the operating data, can be stored in the manager storage unit 122. In some embodiments, the fleet-management system 120 and/or any or all of the individual the manager storage unit 122, the manager processor 124, the manager communication unit 126, can reside on one or more of the self-driving vehicles 110.

Figure 2:
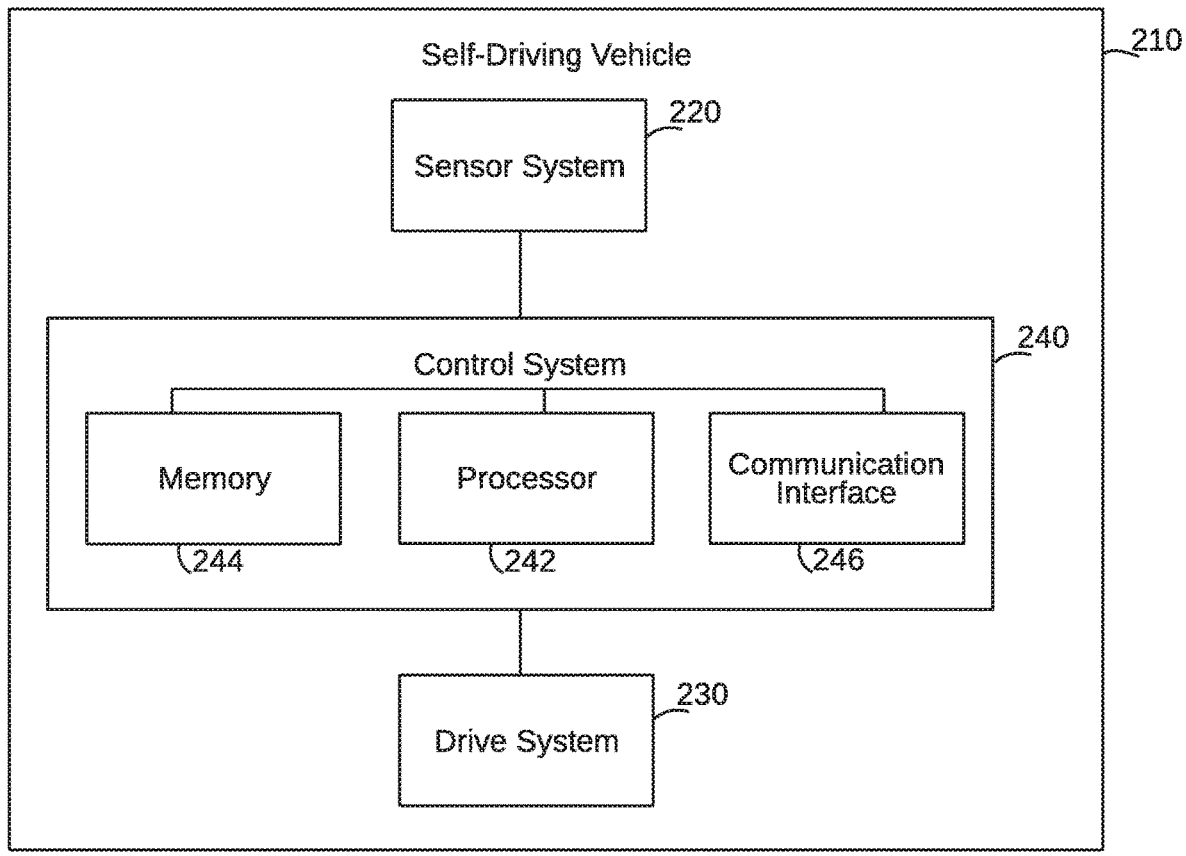
FIG. 2 is a block diagram of a self-driving vehicle, according to at least one embodiment.

Referring now to FIG. 2, which shows a block diagram of an example self-driving vehicle 210. The self-driving vehicle 210 includes a sensor system 220, a control system 240 and a drive system 230.

The sensor system 220 can include one or more sensors for collecting data from the environment of the self-driving vehicle 110. For example, the sensor system 220 can include a LiDAR device (or other optical, sonar, or radar-based range-finding devices operating on known principles such as time-of-flight). The sensor system 220 can include optical sensors, such as video cameras and systems (e.g., stereo vision, structured light).

The control system 240 can include a processor 242, a memory (or storage unit) 244, and a communication interface 246. The control system 240 facilitates the operation of the self-driving vehicle 110. The control system 240 can store an electronic map that represents the environment of the self-driving vehicle 110, such as a facility, in the memory 244.

The processor 242 can include any suitable processors, controllers or digital signal processors that can provide sufficient processing power depending on the configuration, purposes and requirements of the self-driving vehicle 110. In some embodiments, the processor 242 can include more than one processor with each processor being configured to perform different dedicated tasks.

The memory 244 can store data to be used during the operation of the self-driving vehicle 110 and/or to facilitate the operation of the self-driving vehicle 110. Example data can include operating data in respect of its operation, the electronic map representing its environment, data in respect of one or more other self-driving vehicles 110, data in respect of its mission, etc.

In some embodiments, the memory 244 can store software applications executable by the processor 242. For example, the software application includes image processing applications that facilitate image data collection by the self-driving vehicle 110.

The communication interface 246 can include any component for facilitating communication with the other components of the communication system 100 via the communication network 130. For example, the communication interface 246 can include a wireless transceiver for communicating within a wireless communications network.

The self-driving vehicle 110 can receive a mission from the fleet management system 120 or an external system. The mission received from the fleet management system 120 can include one or more waypoints or destination locations. Based on the received mission, the control system 240 can determine a path for the self-driving vehicle 110 to navigate to the waypoint or destination location with minimal, if any, instructions from another system or the users. The control system 240 and the sensor system 220 can navigate the self-driving vehicle 110 without any additional navigational aids (e.g., navigational targets, magnetic strips, or paint/tape traces) installed in the environment.

For example, the control system 240 can generate a path for the self-driving vehicle 110 to a destination location based on the location of the self-driving vehicle 110. The control system 240 can then operate the drive system 230 to direct the self-driving vehicle 110 along the planned path. As the self-driving vehicle 110 travels along the planned path, the sensor system 220 can collect data from the environment. The collected data can assist the control system 240 to track the progress of the self-driving vehicle 110 along the planned path and also to update a location of the self-driving vehicle 110 within the environment. Example data collected by the sensor system 220 can include images of the environment.

At least with the data collected by the sensor system 220, the control system 240 can determine when an unexpected obstacle is in the planned path, and modify the planned path to navigate around the obstacle.

In some embodiments, the self-driving vehicle 110 can be equipped with one or more end effectors for facilitating interaction with objects within the environment. Example end effectors can include a gripper, a clamp, a shovel, a broom, a vacuum, a rotating spindle, or any other tools. The operation of the end effectors can be controlled by the control system 240 and, in some embodiments, with consideration of the data collected by the sensor system 220.

The self-driving vehicle 110 can operate in environments with varied terrains and/or regulated zones that require environmental qualifications. Example regulated zones can include sterile environments, and temperature-controlled environments (e.g., high or low temperature environments). The self-driving vehicle 110 can be configured to comply with the requirements of the various terrains and/or zones within its environment. For example, a self-driving vehicle 110 can be sterilized to operate in a sterile environment and subsequently only operate within the boundaries of the sterile environment in order to maintain its qualification. Self-driving vehicles 110 may undergo environmental testing or include higher rated components to meet other environmental qualifications.

Figure 3:
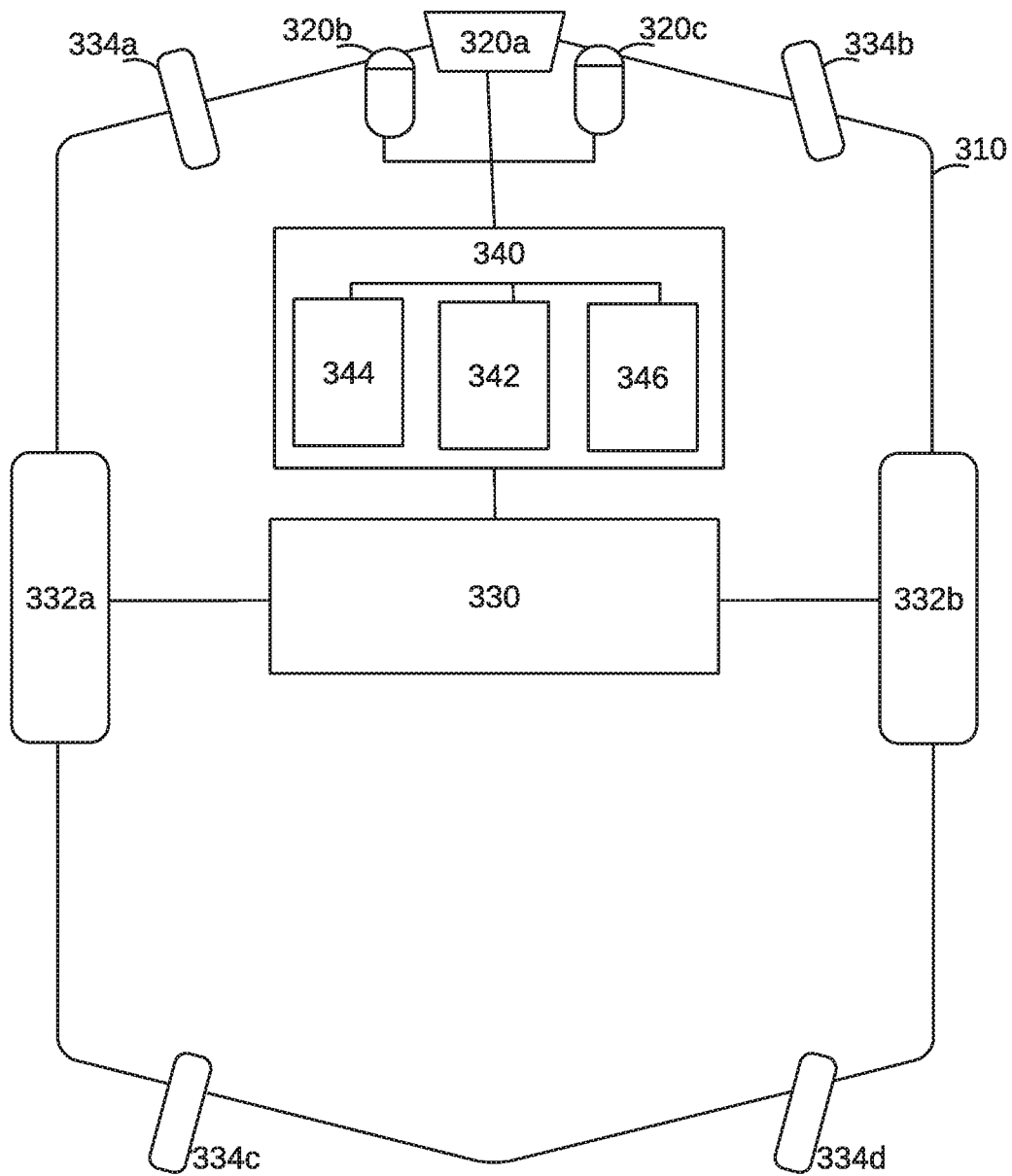
FIG. 3 is a block diagram of an example self-driving transport vehicle, according to at least one embodiment.

FIG. 3 shows a block diagram of another example self-driving vehicle 310. The self-driving vehicle 310 can act as a self-driving transport vehicle 310 for transporting objects between different locations. The self-driving transport vehicle 310 can include a cargo component for carrying loads. For example, the cargo component can be a flatbed or a bucket having sidewalls to prevent loads from falling out as the self-driving transport vehicle 310 moves. The self-driving transport vehicle 310 can include cargo securing mechanisms to secure the load and prevent the load from falling off the self-driving transport vehicle 310. Although the self-driving vehicle 310 can act as a self-driving transport vehicle, the self-driving vehicle 310 is not limited to transporting objects.

Similar to the self-driving vehicle 210 of FIG. 2, the self-driving vehicle 310 includes a drive system 330, a sensor system 320 and a control system 340.

The drive system 330 includes a motor and/or brakes connected to drive wheels 332a and 332b for driving the self-driving transport vehicle 310. The motor can be, but is not limited to, an electric motor, a combustion engine, or a combination/hybrid thereof. Depending on the application of the self-driving vehicle 310, the drive system 330 may also include control interfaces that can be used for controlling the drive system 330. For example, the drive system 330 may be controlled to drive the drive wheel 332a at a different speed than the drive wheel 332b in order to turn the self-driving transport vehicle 310. Different embodiments may use different numbers of drive wheels, such as two, three, four, etc.

A number of wheels 334 may be included. The self-driving vehicle 310 includes wheels 334a, 334b, 334c, and 334d. The wheels 234 may be wheels that are capable of allowing the self-driving transport vehicle 310 to turn, such as castors, omni-directional wheels, and mecanum wheels. In some embodiments, the self-driving transport vehicle 310 can be equipped with special tires for rugged surfaces or particular floor surfaces unique to its environment.

The sensor system 320 in FIG. 3 includes example sensors 220a, 220b, and 220c. The sensors 220a, 220b, 220c can optical sensors arranged to provide three-dimensional (e.g. binocular or RGB-D) imaging.

The positions of the components 334, 320, 340, 330, 332 of the self-driving transport vehicle 310 are shown for illustrative purposes and are not limited to the illustrated positions. Other configurations of the components 334, 320, 340, 330, 332 can be used depending on the application of the self-driving transport vehicle 310 and/or the environment in which the self-driving transport vehicle 310 will be used.

Figure 4:
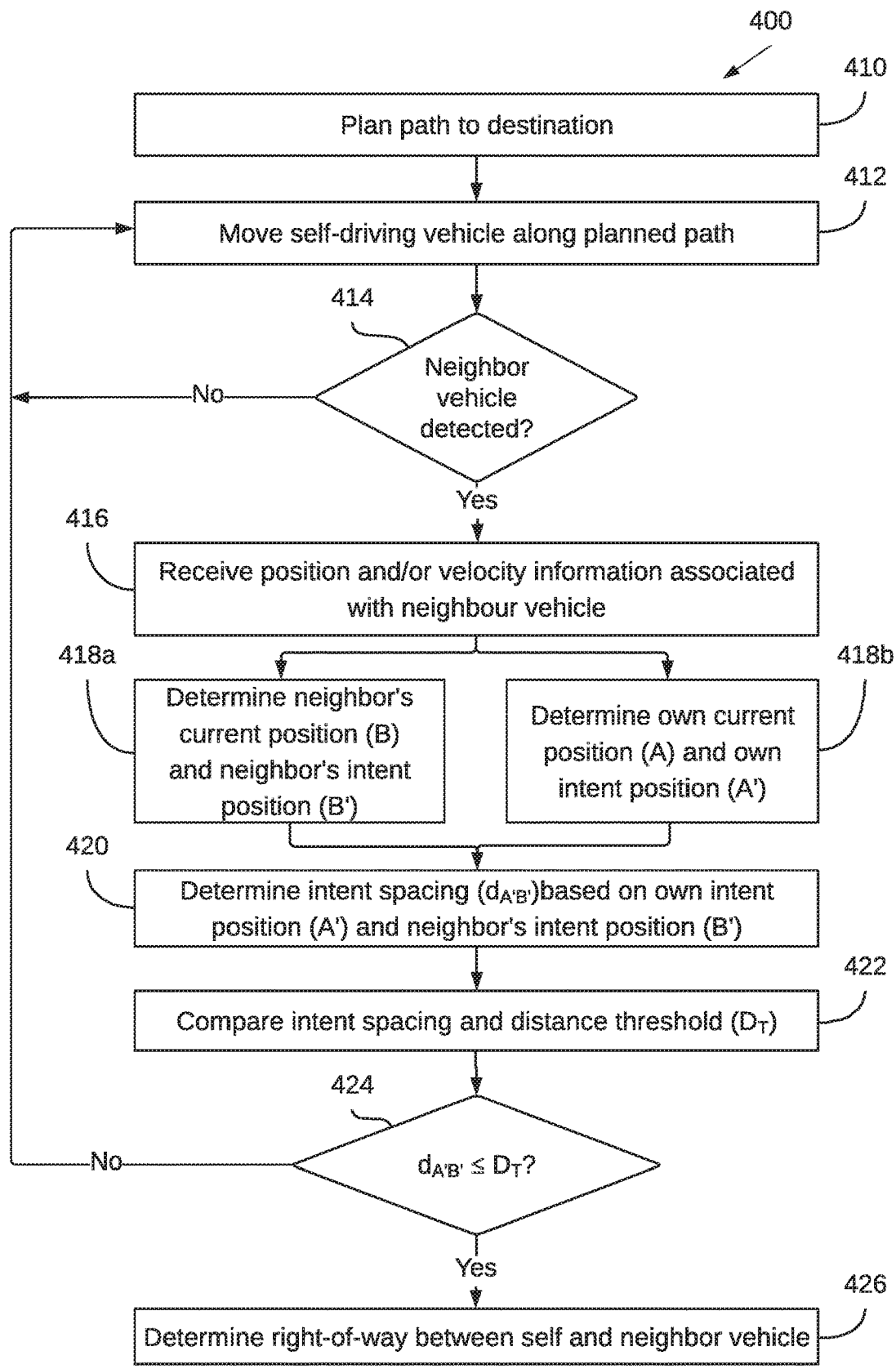
FIG. 4 is a flow diagram of a method for self-driving vehicle traffic management, according to at least one embodiment.

For illustrating some embodiments of the described methods and systems, reference will now be made to FIG. 4. FIG. 4 shows an example method 400 for self-driving vehicle traffic management. According to some embodiment, any or all of methods 400, 600, and 1100 may be used together as a method for self-driving vehicle traffic management.

The method 400 may begin at the step 410 when a self-driving vehicle plans a path to a destination (or any location). For example, the vehicle may plan a path in reference to a stored electronic map, such as a map of an industrial facility in which the vehicle is operating. At the step 412, the vehicle moves along the planned path, such as by using the vehicle's control system and drive system.

At the step 414, which may operate concurrently with step 412, the vehicle may detect a neighbor vehicle. If the vehicle does not detect a neighbor vehicle, then the method continues through step 412; that is, the vehicle continues to move along its planned path.

According to some embodiments, a vehicle may detect a neighbor vehicle with its sensor system. For example, the sensor system may include a LiDAR and/or vision system (e.g. cameras), which may detect a neighbor vehicle.

According to some embodiments, the vehicle may detect a neighbor vehicle by receiving an inter-vehicle communication in respect of the neighbor vehicle, for example, via a communication interface on the vehicle. The communication interface may receive the inter-vehicle communication via a communication network, either directly from the neighbor vehicle, or from the neighbor vehicle via a fleet-management system.

According to some embodiments, the neighbor vehicle may be a car, truck, forklift, industrial tugger, human-propelled vehicle, or other manually operated, automatic, or autonomous vehicle which are not necessarily communicating using the same protocols as the single self-driving vehicle.

According to some embodiments, the inter-vehicle communication in respect of the neighbor vehicle may be in part traverse the factory communications systems 135.

According to some embodiments, the inter-vehicle communication in respect of the neighbor vehicle may be generated by a centralized system which is capable of monitoring vehicle position via radio signals, beacons, infrastructure-mounted cameras, or other global-frame localization methods as known to those skilled in the art.

When the vehicle detects a neighbor vehicle at the step 414, the method proceeds to step 416. At the step 416, the vehicle receives position and/or velocity information associated with a neighbor vehicle. According to some embodiments, the reception of the position and/or velocity information associated with the neighbor vehicle may constitute the event by which the neighbor vehicle is detected at the step 414. That is to say, the reception of the position and/or velocity information may make the detection at the step 414 implicit without any other action or event prior to the reception of the information.

Figure 5:
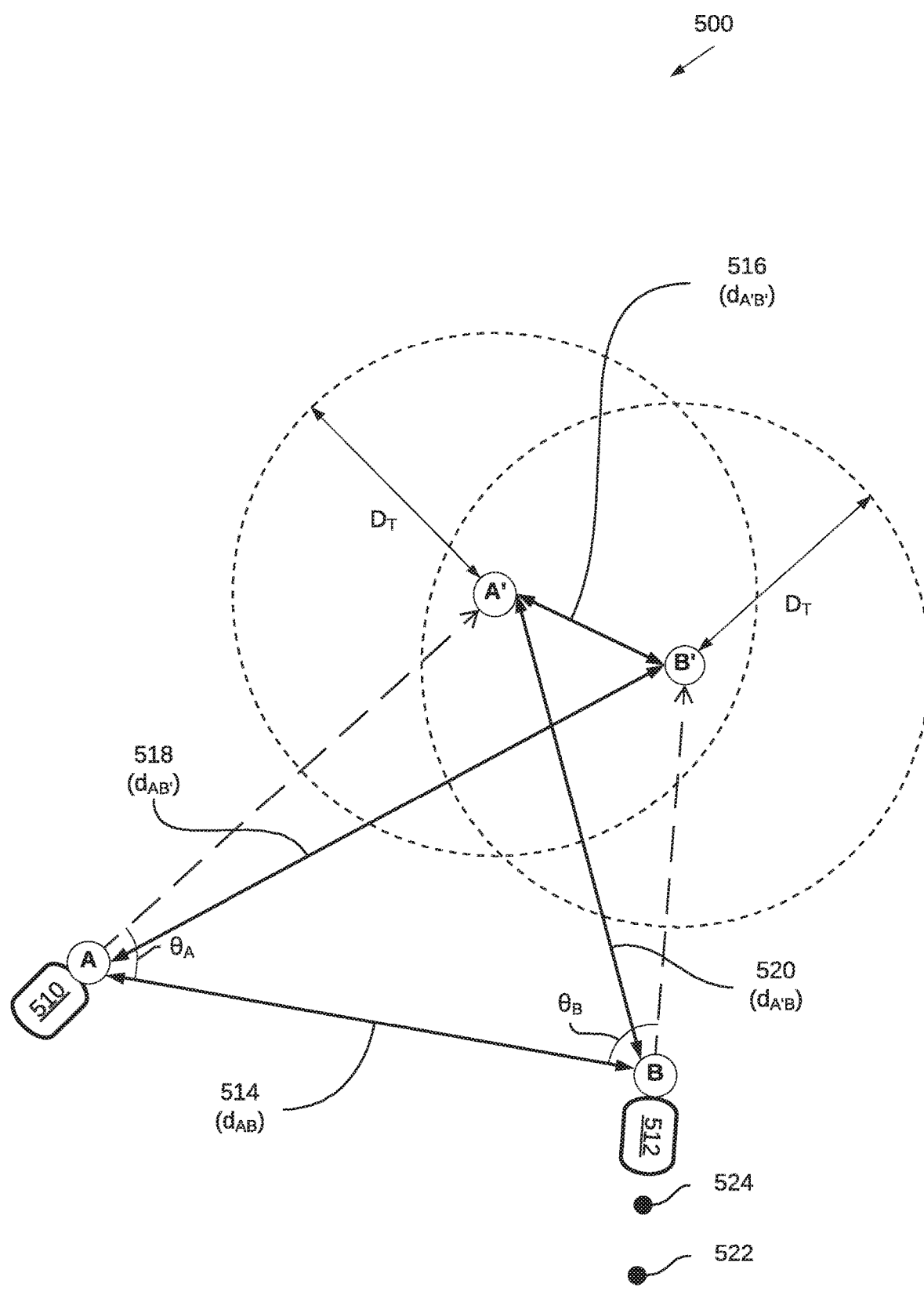
FIG. 5 is a plan view diagram of two vehicles with an intent spacing less than a distance threshold, according to at least one embodiment.

Reference is now made to FIG. 5, which depicts a scenario 500 in which a first vehicle 510 and a second vehicle 512 are operating near each other. For ease of explanation, the vehicle 510 may be regarded as the self-driving vehicle that is executing the method 400 (or a similar method), and the vehicle 512 may be regarded as the neighbor vehicle. Generally, in FIG. 5, the self-driving vehicle 510 and its positions are associated with the letter "A", and the neighbor vehicle 512 and its positions are associated with the letter "B".

While reference is made to the self-driving vehicle 510 as executing the method 400 for ease of explanation, it should be noted that, according to some embodiments, both vehicle 510 and vehicle 512 may be executing the method 400 (or similar methods) simultaneously. In this case, it is important to note that the method(s) being executed by the vehicle 510 and 512 are designed to produce complementary results; that is to say, that both vehicles simultaneously make congruent decisions about each other in order to avoid collisions.

According to some embodiments of step 416, for example if the vehicle 510 has detected the neighbor vehicle 512 with its sensor system (e.g. LiDAR, vision, etc.), the vehicle 510 may calculate estimated velocity information of the neighbor vehicle 512. In such a case, the vehicle may determine the position 522 of the neighbor vehicle 512 at a first time and the position 524 of the neighbor vehicle 512 at a second time. The positions 522 and 524 and the time difference between these positions can be used to extrapolate the velocity of the vehicle 512. As such, the position and/or velocity information of the vehicle 512 can be received by the vehicle 510.

According to some embodiments of step 416, for example, if the vehicle 510 has detected the neighbor vehicle 512 by receiving an inter-vehicle communication in respect of the neighbor vehicle 512, the inter-vehicle communication may include the position and/or velocity information associated with the neighbor vehicle 512. For example, the inter-vehicle communication may provide the neighbor vehicle's position and velocity, and/or the planned path that the neighbor vehicle 512 intends to follow.

After step 416, the method 400 proceeds to steps 418a and 418b, which may be executed concurrently (e.g. in parallel) or in series (either 418a and then 418b; or vice-versa).

At the step 418a, the self-driving vehicle determines the current position and an intent position for the neighbor vehicle. For example, FIG. 5 shows a current position B and an intent position B' for the neighbor vehicle 512. According to some embodiments, the current position B and intent position B' of the neighbor vehicle 512 may be determined based on the position and or velocity information received at the step 416, and/or based on the planned path for the vehicle 512 received at the step 416.

At the step 48b, the self-driving vehicle determines its own current position and intent position. For example, FIG. 5 shows a current position A and an intent position A' for the self-driving vehicle 510. According to some embodiments, the self-driving vehicle may determine its own position and intent position in reference to a stored electronic map, using the vehicle's control system and sensor system.

According to some embodiments, the current positions A and B, and the intent positions A' and B' are relative to a common time; that is, the self-driving vehicle 510 is at its current position A at the same time that the neighbor vehicle 512 is at its current position B; and the intent position A' for the self-driving vehicle 510 is determined for the same time as the intent position B' for the neighbor vehicle 512. It should be noted that, as used in this paragraph, the term "common time" does not necessarily require that the self-driving vehicle 510 and the neighbor vehicle 512 are operating with synchronized clocks; rather, the term is used for providing a generally common temporal reference for the sake of describing FIG. 5.

At the step 420, the self-driving vehicle determines an intent spacing, which is the distance between the intent position of the self-driving vehicle and the intent position of the neighbor vehicle. For example, FIG. 5 shows an intent position $d_{A'B'}$ 516, which is the distance between the self-driving vehicle 510 intent position A' and the neighbor vehicle 512 intent position B'.

At the step 422, the intent spacing is compared to a distance threshold in order to determine if the self-driving vehicle and the neighbor vehicle will be in close enough proximity to evoke a right-of-way scenario between the two vehicles (e.g. if a collision is imminent or likely). To assist in explanation, FIG. 5 shows two circles in dashed lines, centered around A' and B' respectively, with a radius equal to the distance threshold $D_T$. As such, if A' is within the dashed circle around B', and/or if B' is within the dashed circle around A', then the intent spacing $d_{A'B'}$ 516 is less than (or equal to) the distance threshold $D_T$.

If, at the step 424, the intent spacing $d_{A'B'}$ is greater than the distance threshold $D_T$, then the method returns to step 412. In other words, if the intent spacing $d_{A'B'}$ is greater than the distance threshold $D_T$, then the likelihood of an imminent collision with the neighbor vehicle is substantially low, and the self-driving vehicle may therefore continue moving along its planned path without concern for the neighbor vehicle.

If, at the step 424, the intent spacing $d_{A'B'}$ is less than (or equal to) the distance threshold $D_T$, then the method proceeds to step 426 so that a right-of-way between the self-driving vehicle and the neighbor vehicle can be determined.

Figure 6:
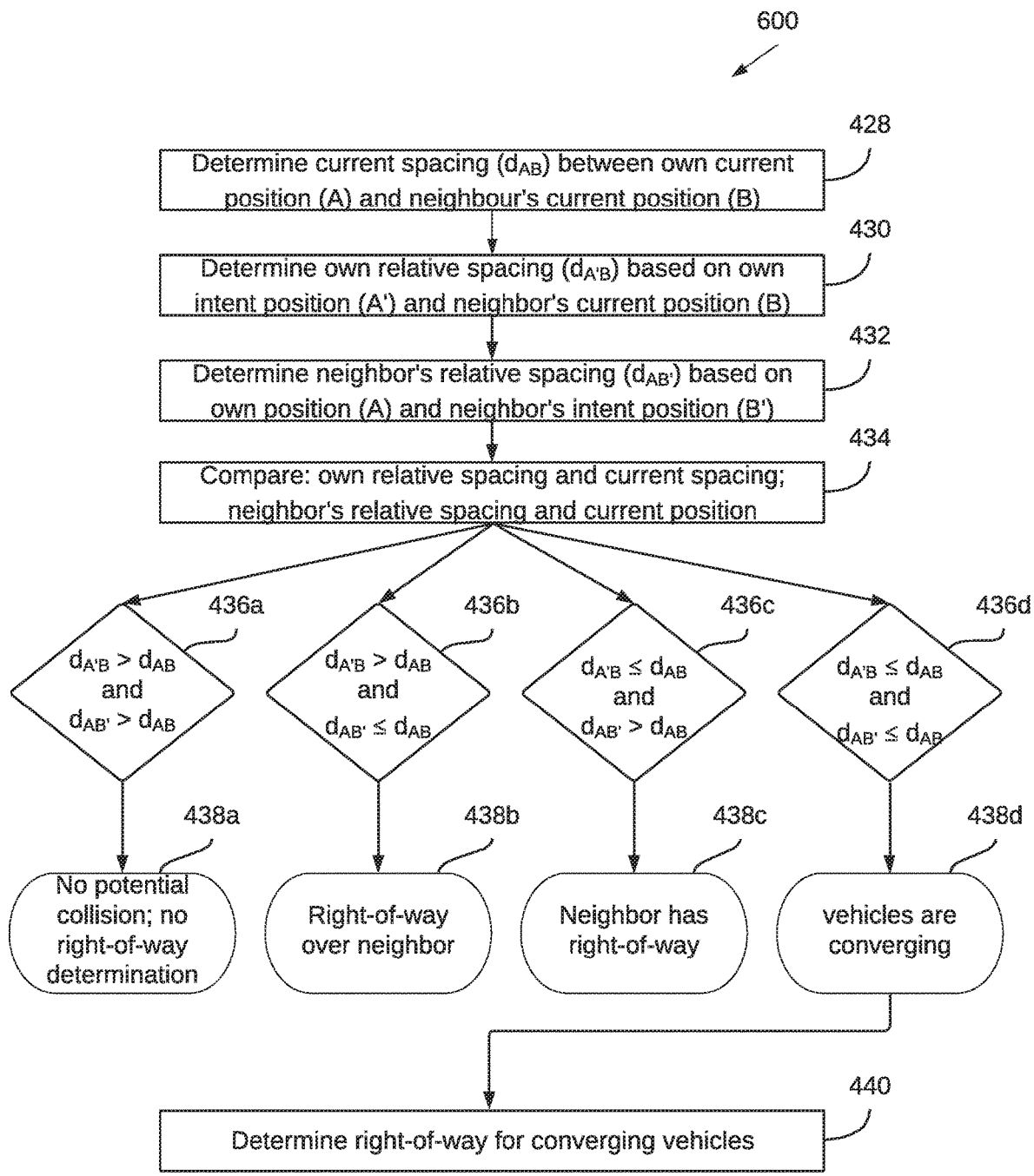
FIG. 6 is a flow diagram of a method for self-driving vehicle traffic management, according to at least one embodiment.

An example method 600 for determining a right-of-way between the self-driving vehicle and the neighbor vehicle is shown in FIG. 6. When it has been determined that a right-of-way determination is to be made between the self-driving vehicle and the neighbor vehicle (for example, at the step 426), then the method 600 evokes step 428.

At the step 428, the self-driving vehicle determines the current spacing, which is the distance between its own current position and the neighbor vehicle's current position. For example, in FIG. 5, the current spacing $d_{AB}$ 514 is shown between the current position A of the self-driving vehicle 510 and the current position B of the neighbor vehicle 512.

At the step 430, the self-driving vehicle determines its relative spacing, which is the distance between its own intent position and the neighbor vehicle's current position. For example, in FIG. 5, the relative spacing $d_{A'B}$ 520 is shown between the intent position A' of the self-driving vehicle 510 and the current position B of the neighbor vehicle 512.

Similarly, at the step 432, the self-driving vehicle determines the relative spacing of the neighbor vehicle, which is the distance between its own current position and the neighbor vehicle's intent position. For example, in FIG. 5, the neighbor vehicle's relative spacing $d_{AB'}$ 518 is shown between the current position A of the self-driving vehicle 510 and the intent position B' of the neighbor vehicle 512.

At the step 434, the self-driving vehicle's relative spacing is compared with the current spacing, and the neighbor vehicle's relative spacing is compared with the current spacing in order to determine the interaction state of the two vehicles. Generally, the interaction states fall into one of four categories based on these comparisons.

Figure 7:
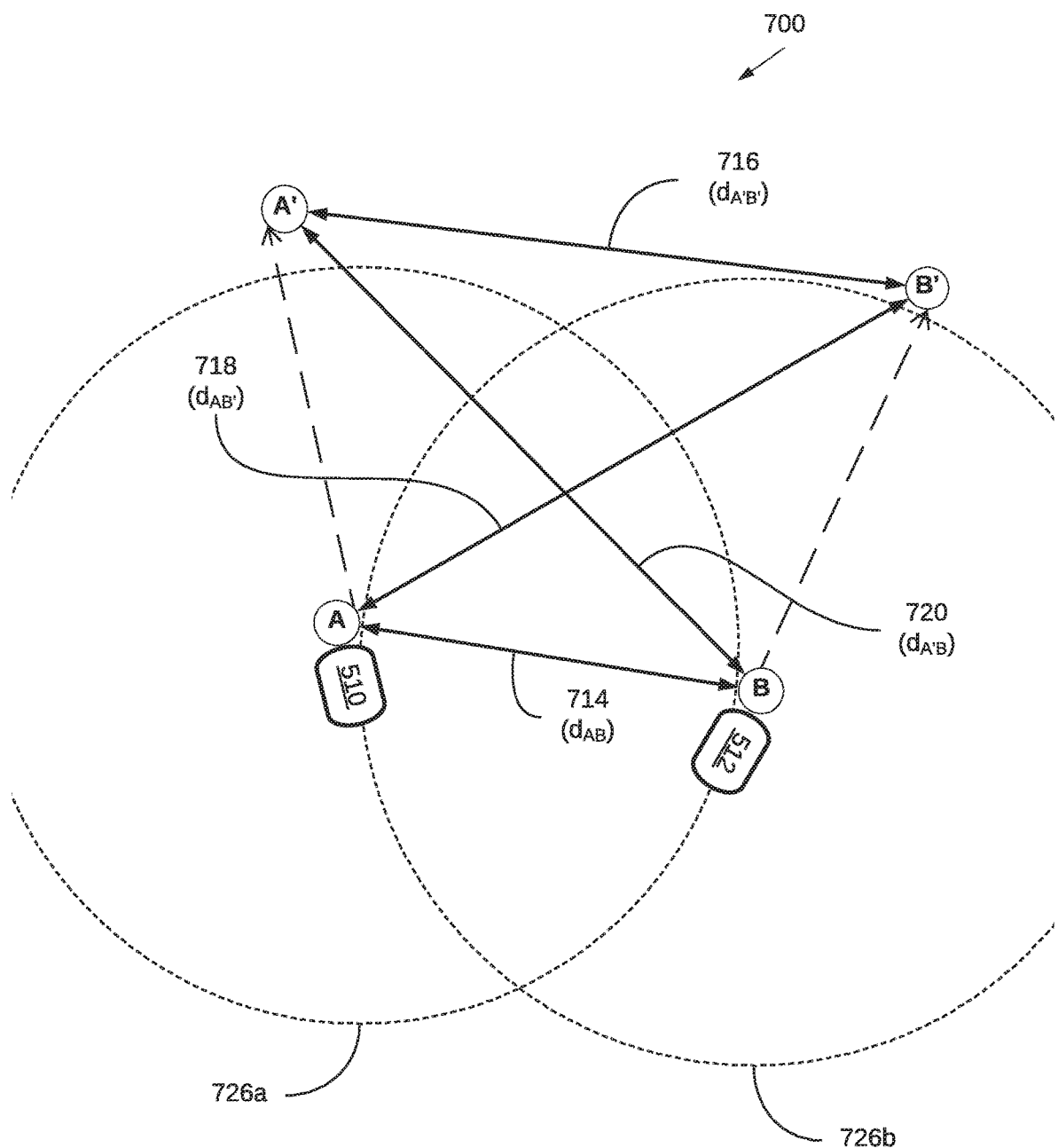
FIG. 7 is a plan view diagram of two diverging vehicles, according to at least one embodiment.

First, if both the self-driving vehicle's relative spacing and the neighbor vehicle's relative spacing are both greater than the current spacing, then the vehicles can be considered as diverging. An example of a "diverging" scenario 700 is shown in FIG. 7, as will be described further below.

Figure 8:
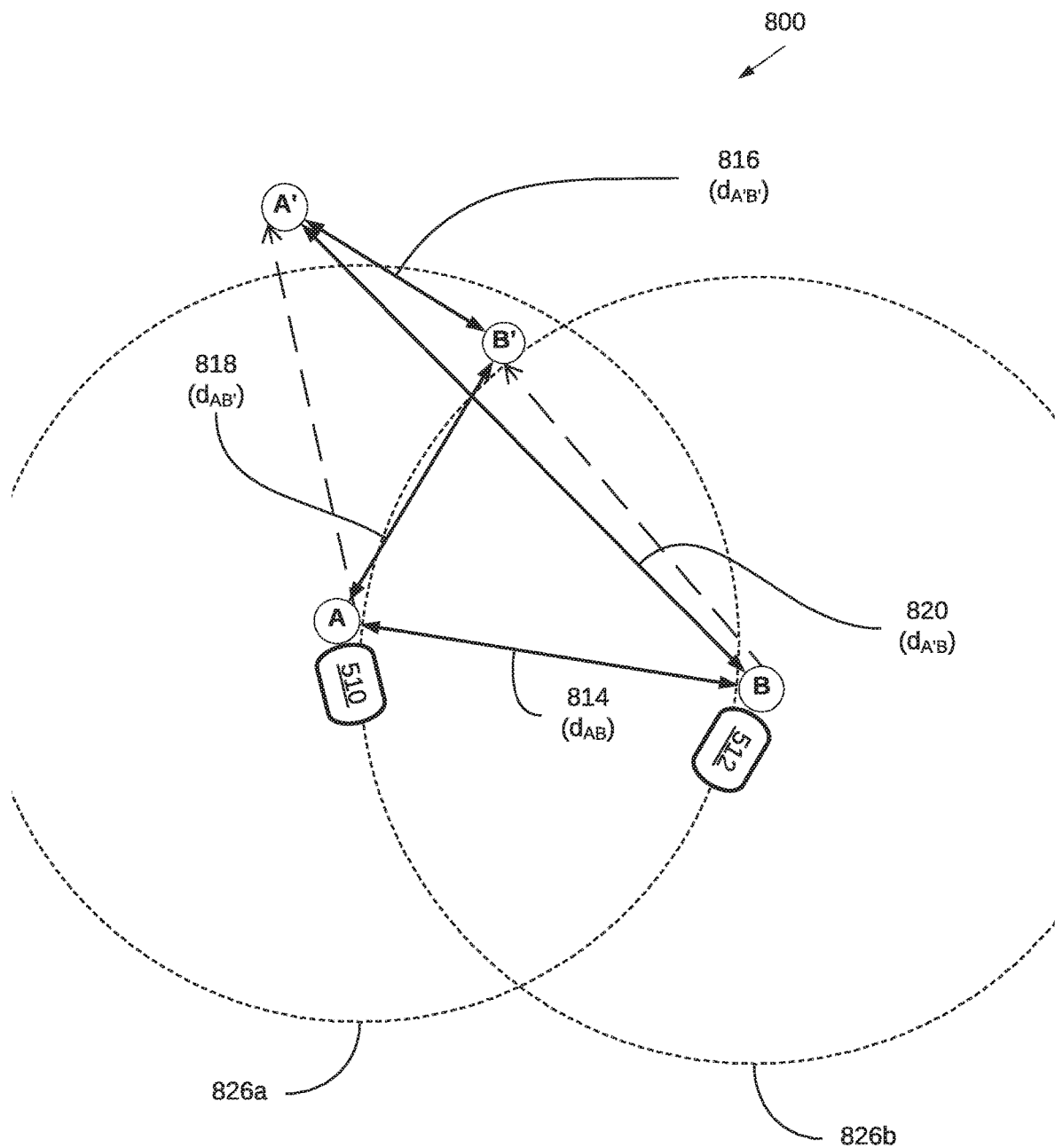
FIG. 8 is a plan view diagram of two vehicles with one vehicle leading the other vehicle, according to at least one embodiment.

Second, if the self-driving vehicle's relative spacing is greater than the current spacing and the neighbor vehicle's relative spacing is less than (or equal to) the current spacing, then the self-driving vehicle can be considered as leading and the neighbor vehicle can be considered as lagging. An example of a "leading" scenario 800 is shown in FIG. 8, as will be described further below.

Figure 9:
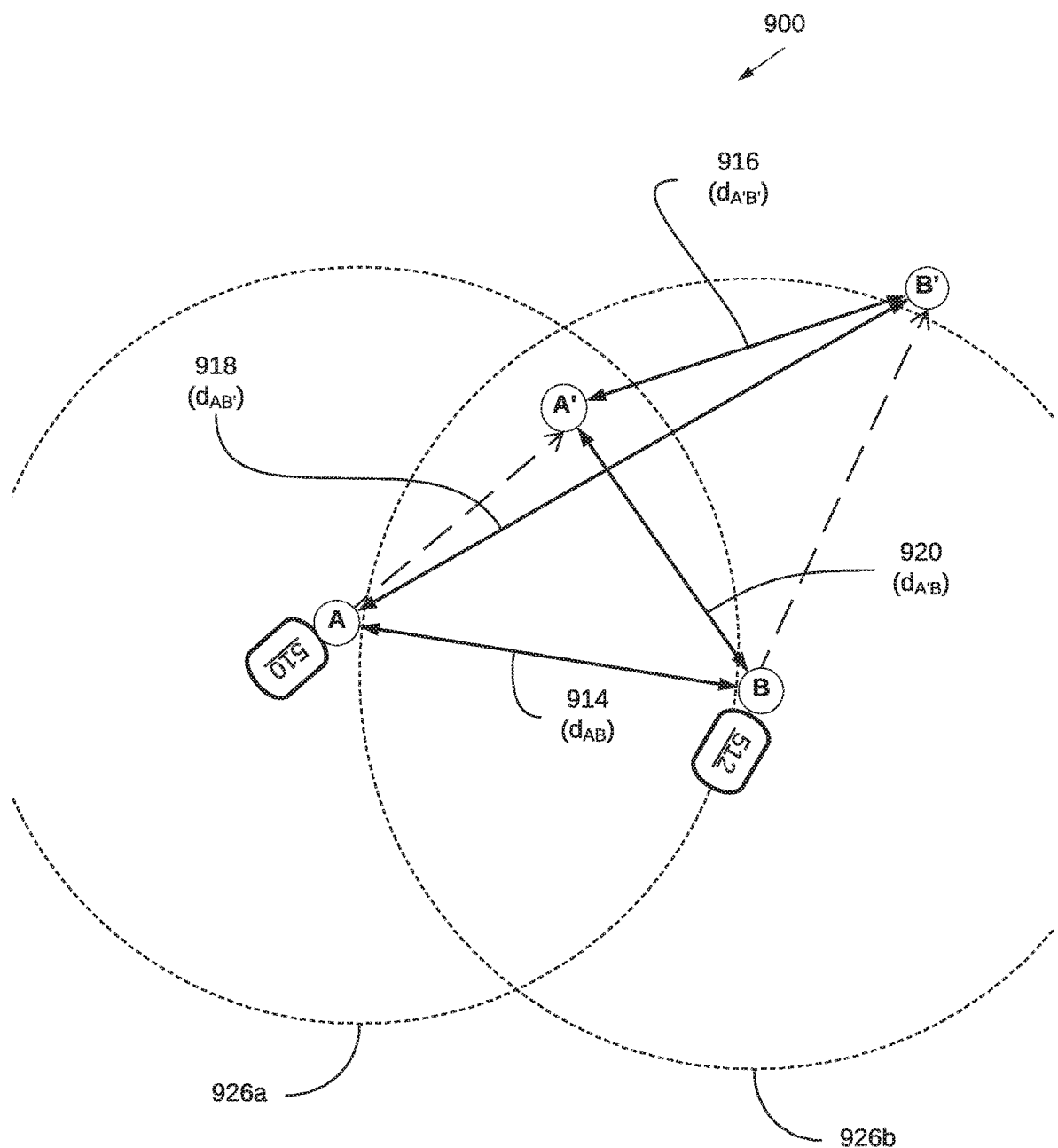
FIG. 9 is a plan view diagram of two vehicles with one vehicle lagging the other vehicle, according to at least one embodiment.

Third, and conversely to the second, if the self-driving vehicle's relative spacing is less than (or equal to) the current spacing and the neighbor vehicle's relative spacing is greater than the current spacing, then the self-driving vehicle can be considered as lagging and the neighbor vehicle can be considered as "leading". An example of a "lagging" scenario 900 is shown in FIG. 9, as will be described further below.

Figure 10:
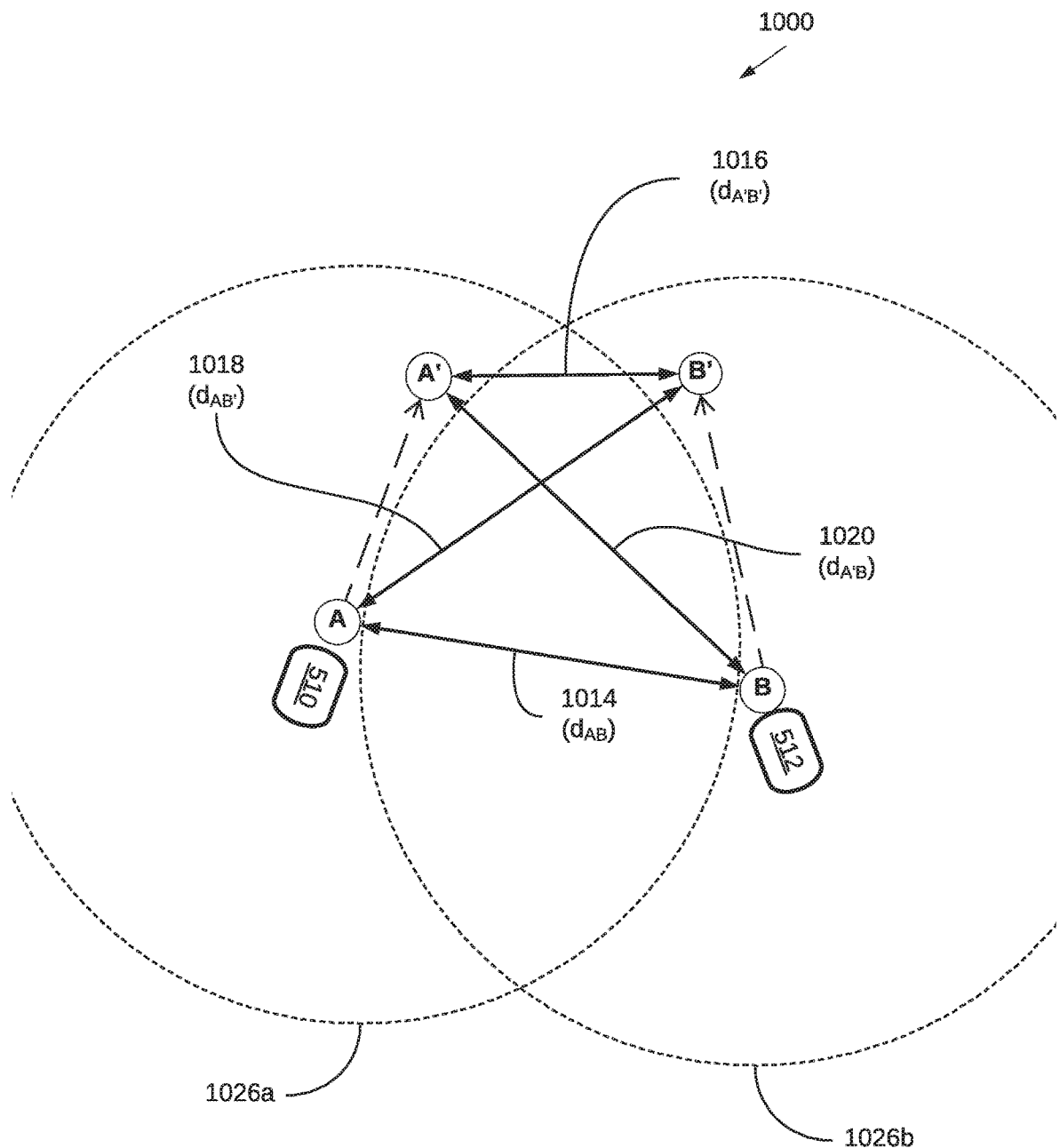
FIG. 10 is a plan view diagram of two converging vehicles, according to at least one embodiment.

Fourth, if both the self-driving vehicle's relative spacing and the neighbor vehicle's relative spacing are less than (or equal to) the current spacing, then the vehicles can be considered as converging. An example of a "converging" scenario 1000 is shown in FIG. 10, as will be described further below.

According to some embodiments, the algorithm depicted by steps 436a through 436d is designed such that one and only one option of steps 436a through 436d is logically possible.

If the comparison at the step 434 demonstrates that the relative spacing of both the self-driving vehicle and the neighbor vehicle is greater than the current spacing (i.e. $d_{A'B} > d_{AB}$ and $d_{AB'} > d_{AB}$), then the method proceeds through step 436a to step 438a based on the determination that an imminent collision is unlikely and that no right-of-way determination needs to be made. According to some embodiments, this means that both vehicles can continue to move along their planned paths, for example, without any variation in direction or speed.

Referring to FIG. 7, there is shown an example scenario 700 in which two vehicles are diverging. Generally, in respect of FIGS. 7, 8, 9, and 10, similar numbers and nomenclature have been used to denote similar elements as in FIG. 5. According to some embodiments, each of FIGS. 7, 8, 9, and 10 is assumed to be scenarios in which it has already been determined that the intent spacing $d_{A'B'}$ is less than (or equal to) the distance threshold $D_T$. In other words, the descriptions associated with FIGS. 7, 8, 9, and 10 assume that it has been previously determined that a right-of-way between the self-driving vehicle 510 and the neighbor vehicle 512 is required.

As shown in FIG. 7, the self-driving vehicle 510 has a current position A and an intent position A'. Similarly, the neighbor vehicle 512 has a current position B and an intent position B'. (The long-dashed lines indicate a path that each vehicle may take to its intent position). In the scenario 700, the vehicles are considered to be diverging, since both the self-driving vehicle's relative spacing dA'B 720 and the neighbor vehicle's relative spacing $d_{AB'}$ 718 are greater than the current spacing.

For ease of explanation, FIG. 7 includes two circles 726a and 726b, shown in dotted lines, with a radius equal to the current spacing $d_{AB}$ 714. As such, the self-driving vehicle's relative spacing $d_{A'B}$ 720 and the neighbor vehicle's relative spacing $d_{AB'}$ 718 can be seen to be greater than the current spacing $d_{AB}$ 714, since both A' and B' are outside the circles 726a and 726b. According to some embodiments, the intent spacing $d_{A'B'}$ 716 is assumed to be less than (or equal to) a distance threshold $D_T$.

Referring back to FIG. 6, if the comparison at the step 434 demonstrates that the relative spacing of the self-driving vehicle is greater than the current spacing, and the relative spacing of the neighbor vehicle is less than (or equal to) the current spacing (i.e. $d_{A'B} > d_{AB}$ and $d_{AB'} \leq d_{AB}$), then the method proceeds through step 436b to step 438b based on the determination that a collision may be likely and that the self-driving vehicle is leading the neighbor vehicle into the potential collision. As such, a right-of-way determination can be made. According to some embodiments, the self-driving vehicle can be determined to have the right-of-way over the neighbor vehicle. According to some embodiments, this means that the neighbor vehicle may yield to the self-driving vehicle. According to some embodiments, based on this determination the self-driving vehicle may continue on its planned path, for example, without any variation in direction or speed as compared with the planned path. On the other hand, the neighbor vehicle may alter is direction and/or speed in order to yield to the self-driving vehicle.

Referring to FIG. 8, there is shown an example scenario 800 in which the self-driving vehicle 510 is leading the neighbor vehicle 512 (i.e. the neighbor vehicle 512 is lagging). In the scenario 800, the self-driving vehicle 510 is considered to be leading the neighbor vehicle 512, since the self-driving vehicle's relative spacing $d_{A'B}$ 720 is greater than the current spacing $d_{AB}$ 814 and the neighbor vehicle's relative spacing $d_{AB'}$ 718 is less than (or equal to) the current spacing $d_{AB}$ 814.

For ease of explanation, the self-driving vehicle's relative spacing $d_{A'B}$ 820 can be seen to be greater than the current spacing $d_{AB}$ 814, since A' is outside the circles 826a and 826b (each with radius equal to the current spacing $d_{AB}$ 814). Similarly, the neighbor vehicle's relative spacing $d_{AB'}$ GF18 can be seen to be less than the current spacing $d_{AB}$ 814, since B' is inside at least one of the circles 826a and 826b. According to some embodiments, the intent spacing $d_{A'B'}$ 816 is assumed to be less than (or equal to) a distance threshold $D_T$.

Referring back to FIG. 6, if the comparison at the step 434 demonstrates that the relative spacing of the self-driving vehicle is less than (or equal to) the current spacing, and the relative spacing of the neighbor vehicle is greater than the current spacing (i.e. $d_{A'B} \leq d_{AB}$ and $d_{AB'} > d_{AB}$), then the method proceeds through step 436c to step 438c based on the determination that a collision may be likely and that the self-driving vehicle is lagging the neighbor vehicle into the potential collision. As such, a right-of-way determination can be made. According to some embodiments, the neighbor vehicle can be determined to have the right-of-way over the self-driving vehicle. According to some embodiments, this means that the self-driving vehicle may yield to the neighbor vehicle. According to some embodiments, based on this determination the self-driving vehicle may yield to the neighbor vehicle, for example, by varying its direction or speed with respect to the planned path. On the other hand, the neighbor vehicle may continue on its planned path, for example, without any variation in direction or speed.

Referring to FIG. 9, there is shown an example scenario 900 in which the self-driving vehicle 510 is lagging the self-driving vehicle 512 (i.e. the neighbor vehicle 512 is leading). In the scenario 900, the self-driving vehicle 510 is considered to be lagging the neighbor vehicle 512, since the self-driving vehicle's relative spacing $d_{A'B}$ 920 is less than the current spacing $d_{AB}$ 914 and the neighbor vehicle's relative spacing $d_{AB'}$ 918 is greater than the current spacing $d_{AB}$ 914.

According to some embodiments, the scenario 900 can be seen as complementary to the scenario 800 respective to the two vehicles 510 and 512. In other words, if each of the two vehicles 510 and 512 are determining right-of-way according to the same (or substantially similar) algorithms, then the analysis previously described for the scenario 800 as performed by the vehicle 510 is the same as the analysis described here for the scenario 900 if it were performed by the vehicle 512; and vice-versa. As such, if the vehicle 510 determines that it is leading and the other vehicle 512 is lagging, then the other vehicle 512 also determines that it is lagging and that the vehicle 510 is leading.

For ease of explanation, the self-driving vehicle's relative spacing $d_{A'B}$ 920 can be seen to be less than the current spacing $d_{AB}$ 914, since A' is inside at least one of the circles 926a and 926b (each with radius equal to the current spacing $d_{AB}$ 914). Similarly, the neighbor vehicle's relative spacing $d_{AB'}$ 918 can be seen to be greater than the current spacing $d_{AB}$ 914, since B' is outside the circles 926a and 926b. According to some embodiments, the intent spacing $d_{A'B'}$ 916 is assumed to be less than (or equal to) a distance threshold $D_T$.

Referring back to FIG. 6, if the comparison at the step 434 demonstrates that the relative spacing of both the self-driving vehicle and the neighbor vehicle are less than (or equal to) the current spacing (i.e. $d_{A'B} \leq d_{AB}$ and $d_{AB'} \leq d_{AB}$), then the method proceeds through step 436d to step 438d based on the determination that a collision is likely and that the vehicles are converging. According to some embodiments, it may be necessary to conduct further analysis in order to determine which vehicle has the right-of-way in a "converging" scenario.

Referring to FIG. 10, there is shown an example scenario 1000 in which the vehicles 510 and 512 are converging. In the scenario 1000, the vehicles 510 and 512 are considered to be converging, since the self-driving vehicle's relative spacing $d_{A'B}$ 1020 is less than the current spacing $d_{AB}$ 1014 and the neighbor vehicle's relative spacing $d_{AB'}$ 1018 is greater than the current spacing $d_{AB}$ 1014.

For ease of explanation, the self-driving vehicle's relative spacing $d_{A'B}$ 1020 can be seen to be less than the current spacing $d_{AB}$ 1014, since A' is inside at least one of the circles 1026a and 1026b (each with radius equal to the current spacing $d_{AB}$ 1014). Similarly, the neighbor vehicle's relative spacing $d_{AB'}$ 1018 can be seen to be less than the current spacing $d_{AB}$ 1014, since B' is outside the circles 1026a and 1026b. According to some embodiments, the intent spacing $d_{A'B'}$ 1016 is assumed to be less than (or equal to) a distance threshold $D_T$.

Once the comparison has been performed at the step 434, and a determination of the comparison has been made vis-à-vis one of 436a through 436d, the method 600 proceed from the respective one of 436a through 436d to the respective one of 438a through 438d. According to some embodiments, there is one (and only one) possible logical determination that can be made from among 436a through 436d.

According to some embodiments, each of the steps 436a to 436c represents a determination that can lead to a decision with respect to controlling the movement of the self-driving vehicle. For example, each determination can be made vis-à-vis a right-of-way determination. That is, a determination can be made as to whether one of the self-driving vehicle and the neighbor vehicle should have a right of way or whether one of the self-driving vehicle and the neighbor vehicle should yield.

According to some embodiments, there are three possible determinations that can be made with respect to a particular vehicle: that the vehicle has a right of way; that the vehicle should yield; and that the vehicle neither has to yield nor has right of way. It is possible to implement the systems and methods described herein such that two (or more) vehicles are simultaneously making right-of-way determinations in respect of each other, and that such determinations are logically consistent across the two (or more) vehicles. In such a case, if a first vehicle determines that it has the right-of-way, and that a second vehicle should yield, then the second vehicle determines that is should yield and that the first vehicle has the right of way. According to some embodiments, the third determination mentioned above (that a vehicle neither has to yield nor has the right of way) may be substantially similar to both vehicles simultaneously determining that each has the right of way since no imminent collision is likely. In other words: the term "right of way" can mean that one vehicle must yield in respect of the other in order to avoid a collision; or that neither vehicle has to yield because an imminent collision is unlikely.

According to some embodiments, when a vehicle has a right of way, it means that the vehicle does not need to alter its course. For example, if the vehicle is moving according to a previously-planned path, the vehicle can continue to move along the planned path without any varying its speed or path on account of a neighbor vehicle.

According to some embodiments, when a vehicle is required to yield, it means that the vehicle must alter its course in respect of a neighbor vehicle. The particular mode of altering the vehicles course may vary depending on circumstances and/or vehicle type. For example, a vehicle may yield by replanning a new path such that its intent position creates an intent spacing that is greater than the distance threshold. In this way, overall system efficiency can be improved, since the neighbor vehicle (which has the right of way) is not required to replan its path. Similarly, a vehicle may yield by varying its speed (slowing down or stopping) along its planned path.

The determination 438a means that the vehicles are diverging, and, as a result, a collision is unlikely. As such, the self-driving vehicle determines that neither vehicle should be associated with the yield status. According to some embodiments, both the self-driving vehicle and the neighbor vehicle may be associated with a status indicating that the vehicles neither have to yield nor have right of way. According to some embodiments, both the self-driving vehicle and the neighbor vehicle may be associated with the right-of-way status.

The determination 438b means that the self-driving vehicle is leading the neighbor vehicle (and that the neighbor vehicle is lagging the self-driving vehicle). According to some embodiments, the self-driving vehicle may associate itself with a right-of-way status, and the neighbor vehicle with a yield status.

Conversely to 438b, the determination 438c means that the self-driving vehicle is lagging the neighbor vehicle (and that the neighbor vehicle is leading the self-driving vehicle). According to some embodiments, the self-driving vehicle may associate itself with a yield status, and the neighbor vehicle with a right-of-way status.

According to some embodiments, the right-of-way status and yield status may be assigned in the alternative; such that the leading vehicle is associated with the yield status and the lagging vehicle is associated with the right-of-way status. Generally, the assignment of the right-of-way and yield statuses based on leading and lagging should be consistent within the same method and/or system.

The determination 438d means that the self-driving vehicle and the neighbor vehicle are converging. As such, a right-of-way status and a yield status can each be assigned to one of the two vehicles (through mutual exclusion).

According to some embodiments, the determination 438d may not be sufficient for associating a right-of-way or yield status with either vehicle. As such, the method 600 may proceed to step 440 in order to determine which vehicle should be associated with the right-of-way status and which vehicle should be associated with the yield status. For example, the vehicle approaching from the left (or, alternatively, from the right) may be associated with the right-of-way status while the vehicle approaching from the right (or, alternatively, from the left) may be associated with the yield status.

Figure 11:
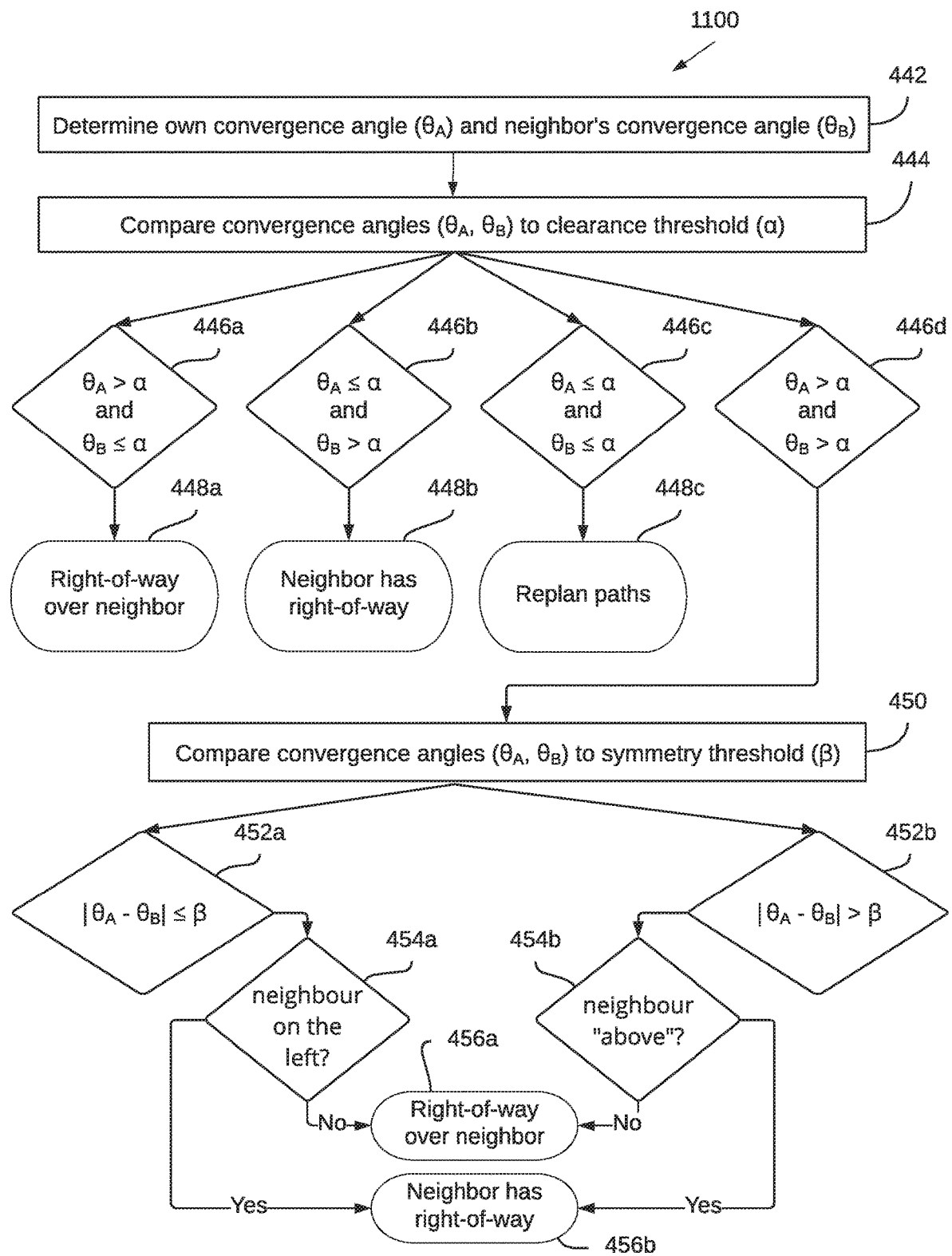
FIG. 11 is a flow diagram of a method for self-driving vehicle traffic management, according to at least one embodiment.

Referring to FIG. 11, there is provided an example method 1100 for determining right-of-way for converging vehicles, parts (or all) of which may comprise step 440 according to some embodiments.

At the step 442, the self-driving vehicle determines is own convergence angle, measured from the line between the current position A of the self-driving vehicle 510 and the current position B of the neighbor vehicle, and the line between the current position A of the self-driving vehicle 510 and the intent position A' of the self-driving vehicle. According to some embodiments, the self-driving vehicle may also determine the convergence angle of the neighbor vehicle, measured form the line between the neighbor vehicle's current position and the self-driving vehicle's current position, and the line between the neighbor vehicle's current position and the neighbor vehicle's intent position.

For ease of explanation, reference is made to FIG. 5, which shows examples of the convergence angle ($\theta_A$) of a self-driving vehicle 510 and the convergence angle ($\theta_B$) of a neighbor vehicle 512. As will now be understood by a person skilled in the art, there are various definitions that are possible for the convergence angles; and for each definition, any of the following algebraic expressions may have to be adjusted accordingly. For example, and referring to FIG. 5, it is also possible to define a convergence angle of the neighbor vehicle as being measured from a line extending from the current position A of the self-driving vehicle 510 through the current position B of the neighbor vehicle 512, to the line between the current position B of the neighbor vehicle 512 to the intent position B' of the neighbor vehicle 512. In such a case, both convergence angles are measured in the same direction (e.g. counter-clockwise) from the same line (e.g. the line extended from A through B), such that the convergence angle of the neighbor vehicle 512 is equal to $180°-\theta_B$. Generally, and as appreciated by a person skilled in the art, the angles referenced herein may be described as signed angles measured between two vectors. The calculations and algebraic expressions may be described in terms of a magnitude and direction.

At the step 444, the self-driving vehicle compares each of the convergence angles to a clearance threshold. According to some embodiments, the clearance threshold can be selected based on the notion of a "head-on" collision. In other words, if a vehicle is approaching a point (e.g. the location of the other vehicle) at a particular angle, it can be said that the vehicle is approaching that point "head on" if the angle is below the clearance threshold. According to some embodiments, the clearance threshold may be 15 degrees or fewer; 10 degrees or fewer; or 5 degrees or fewer.

The convergence angles are compared to the clearance threshold in order to determine the convergence state of the two vehicles. Generally, the convergence states fall into one of four categories based on these comparisons.

Figure 12:
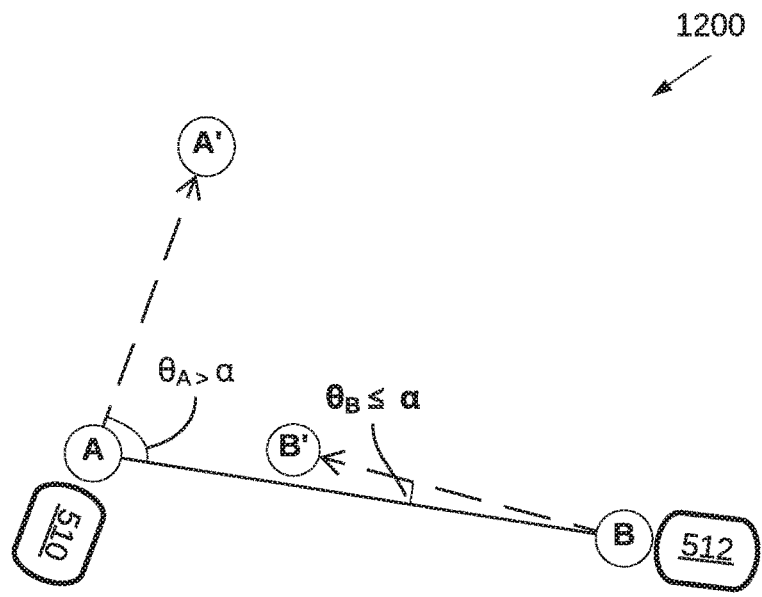
FIG. 12 is a plan view diagram depicting two vehicles, in which one vehicle is in the head-on path of the other vehicle, according to at least one embodiment.

First, if the convergence angle of the self-driving vehicle is greater than the clearance threshold, and the convergence angle of the neighbor vehicle is less than (or equal to) the clearance threshold, then the self-driving vehicle can be said to be "head on" in the path of the neighbor vehicle. An example of a "head on" scenario 1200 (with the self-driving vehicle 510 being "head on" in the path of the neighbor vehicle 512) is shown in FIG. 12.

Figure 13:
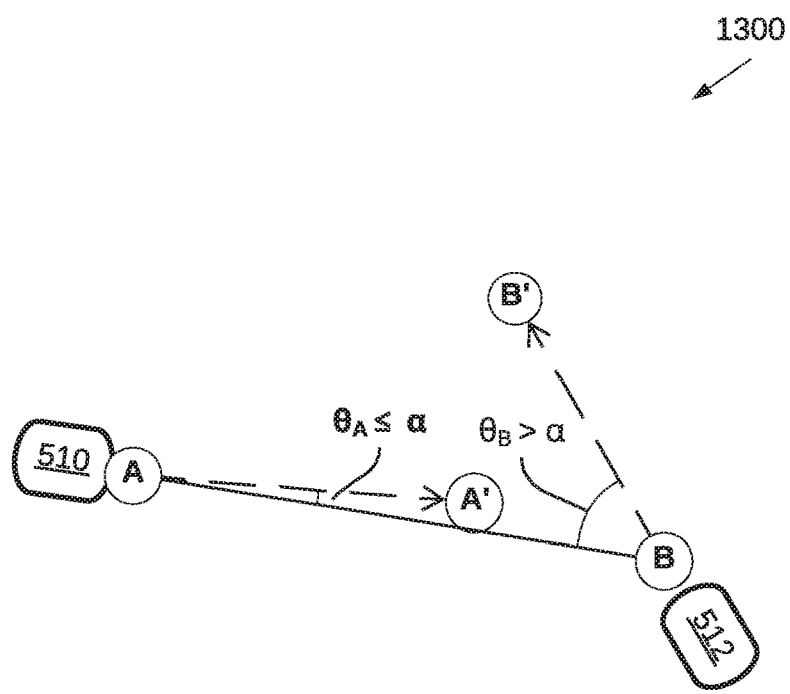
FIG. 13 is a plan view diagram depicting two vehicles, in which one vehicle has the other vehicle in its head-on path, according to at least one embodiment.

Second, and conversely to the first, if the convergence angle of the self-driving vehicle is less than (or equal to) the clearance threshold, and the convergence angle of the neighbor vehicle is greater than the clearance threshold, then the self-driving vehicle can be said to have the neighbor vehicle "head on" in the path of the self-driving vehicle. An example of a "head on" scenario 1300 (with the neighbor vehicle 512 being "head on" in the path of the self-driving vehicle 510) is shown in FIG. 13.

According to some embodiments, the scenario 1300 can be seen as complementary to the scenario 1200 respective to the two vehicles 510 and 512. In other words, if each of the two vehicles 510 and 512 are determining right-of-way according to the same (or substantially similar) algorithms, then the analysis previously described for the scenario 1200 as performed by the vehicle 510 is the same as the analysis described here for the scenario 1300 if it were performed by the vehicle 512; and vice-versa. As such, if the vehicle 510 determines that the neighbor vehicle would see the self-driving vehicle as "head on" in the neighbor vehicle's path in the scenario 1200, then the neighbor vehicle 512 also determines that the self-driving vehicles is "head on" in the neighbor vehicle's path similar to the scenario 1300.

Third, if the convergence angle of the self-driving vehicle is less than (or equal to) the clearance threshold, and the convergence angle of the neighbor vehicle is less than (or equal to) the clearance threshold, then the self-driving vehicle and the neighbor vehicle can be said to be "head on" with each other. An example of a "head on" scenario 1400 (with the self-driving vehicle 510 and the neighbor vehicle 512 each being "head on" with each other) is shown in FIG. 1400.

Fourth, if the convergence angle of the self-driving vehicle is greater than the clearance threshold, and the convergence angle of the neighbor vehicle is greater than the clearance threshold, then neither vehicle is "head on" with the other. In other words, each vehicle is approaching the other vehicle from the side rather than "head on".

According to some embodiments, the algorithm depicted by steps 446a through 446d is designed such that one and only one option of steps 446a through 446d is logically possible.

If the comparison at the step 444 demonstrates that the convergence angle of the self-driving vehicle is greater than the clearance threshold, and the convergence angle of the neighbor vehicle is less than (or equal to) the clearance threshold (i.e. $\theta_A > \alpha$ and $\theta_B \leq \alpha$), then the method proceeds through step 446a to step 448a based on the determination that the self-driving vehicle is "head on" in the path of the neighbor vehicle (and that the neighbor vehicle is not "head on" in the path of the self-driving vehicle). As such, a right-of-way determination can be made. According to some embodiments, the self-driving vehicle can be determined to have the right-of-way over the neighbor vehicle. According to some embodiments, this means that the neighbor vehicle may yield to the self-driving vehicle. According to some embodiments, based on this determination the self-driving vehicle may continue on its planned path, for example, without any variation in direction or speed as compared to the planned path. On the other hand, the neighbor vehicle may alter its direction and/or speed in order to yield to the self-driving vehicle.

Referring to FIG. 12, there is shown an example scenario 1200 in which the self-driving vehicle 510 is "head on" in the path of the neighbor vehicle 512, as represented by the expressions $\theta_A > \alpha$ and $\theta_B \leq \alpha$.

Referring back to FIG. 11, if the comparison at the step 444 demonstrates that the convergence angle of the self-driving vehicle is less than (or equal to) the clearance threshold, and the convergence angle of the neighbor vehicle is greater than the clearance threshold (i.e. $\theta_A \leq \alpha$ and $\theta_B > \alpha$), then the method proceeds through step 446b to step 448b based on the determination that the neighbor vehicle is "head on" in the path of the self-driving vehicle (and that the self-driving vehicle is not "head on" in the path of the neighbor vehicle). As such, a right-of-way determination can be made. According to some embodiments, the neighbor vehicle can be determined to have the right-of-way over the self-driving vehicle. According to some embodiments, this means that the self-driving vehicle may yield to the neighbor vehicle. According to some embodiments, based on this determination the neighbor vehicle may continue on its planned path, for example, without any variation in direction or speed as compared to the planned path. On the other hand, the self-driving vehicle may alter its direction and/or speed in order to yield to the neighbor vehicle.

Referring to FIG. 13, there is shown an example scenario 1300 in which the neighbor vehicle 512 is "head on" in the path of the self-driving vehicle 510, as represented by the expressions $\theta_A \leq \alpha$ and $\theta_B > \alpha$.

Referring back to FIG. 11, if the comparison at the step 444 demonstrates that the convergence angle of the self-driving vehicle is less than (or equal to) the clearance threshold, and the convergence angle of the neighbor vehicle is less than (or equal to) the clearance threshold (i.e. $\theta_A \leq \alpha$ and $\theta_B \leq \alpha$), then the method proceeds through step 446c to step 448c based on the determination that the self-driving vehicle and the neighbor vehicle are each "head on" in the other's path. According to some embodiments, additional steps may be necessary in order to make a right-of-way determination due to the inherent symmetry of the scenario. According to some embodiments, such addition steps may include the assignment of a right-of-way of one vehicle over the other based on arbitrary rules. For example, the vehicle approaching from the right (or left, as the rules may be defined) relative to the electronic map may be assigned a right-of-way status. Similarly, the vehicle approaching with a greater speed (or lower speed, as the rules may be defined) might be assigned a right-of-way status. In such a case, the yielding vehicle may have to replan its path in order to avoid being "head on" in the path of the vehicle with the right of way.

According to some embodiments, when each vehicle is "head on" with the other, it may not be possible to assign a right-of-way status, and one or both vehicles may be required to replan its path in order to avoid the "head on" scenario.

Figure 14:
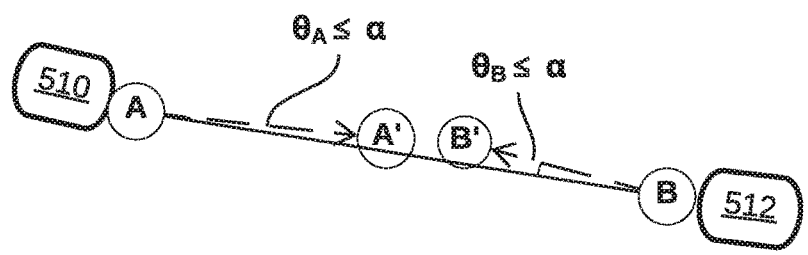
FIG. 14 is a plan view diagram depicting two vehicles that are on a head-on collision course, according to at least one embodiment.

Referring to FIG. 14, there is shown an example scenario 1400 in which the neighbor vehicle 512 and the self-driving vehicle 510 are each "head on" in the other's path, as represented by the expressions $\theta_A \leq \alpha$ and $\theta_B \leq \alpha$.

Referring back to FIG. 11, if the comparison at the step 444 demonstrates that the convergence angle of the self-driving vehicle is greater than the clearance threshold, and the convergence angle of the neighbor vehicle is greater than the clearance threshold (i.e. $\theta_A > \alpha$ and $\theta_B > \alpha$), then the method proceeds through step 446d to step 448d based on the determination that neither the self-driving vehicle nor the neighbor vehicle are "head on" in the other's path. According to some embodiments, additional steps may be necessary in order to make a right-of-way determination due to the inherent symmetry of the scenario.

Figure 15:
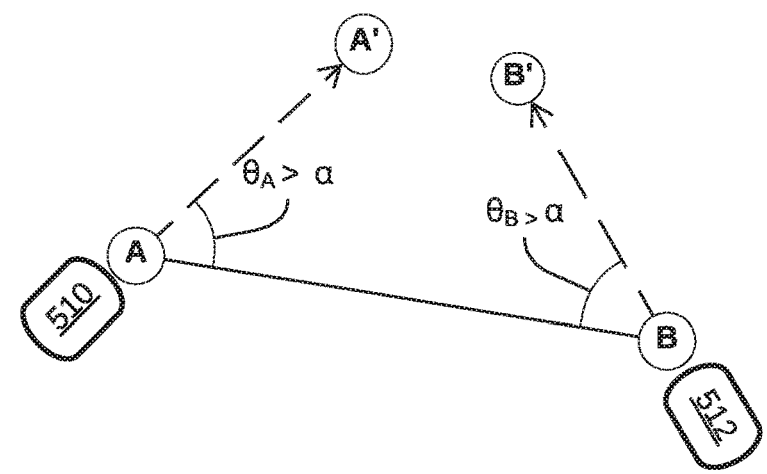
FIG. 15 is a plan view diagram depicting two vehicles converging at similar angles, according to at least one embodiment.

Referring to FIG. 15, there is shown an example scenario 1500 in which neither the self-driving vehicle 510 nor the neighbor vehicle 512 are "head on" in the other's path, as represented by the expressions $\theta_A > \alpha$ and $\theta_B > \alpha$.

Once the comparison has been performed at the step 444, and a determination of the comparison has been made vis-à-vis one of 446a through 446d, the method 1100 proceed from the respective one of 446a through 446d to the respective one of 448a through 448c or 450. According to some embodiments, there is one (and only one) possible logical determination that can be made from among 446a through 446d.

According to some embodiments, each of the steps 446a to 446c represents a determination that can lead to a decision with respect to controlling the movement of the self-driving vehicle. For example, each determination can be made vis-à-vis a right-of-way determination. That is, a determination can be made as to whether one (or none) of the self-driving vehicle and the neighbor vehicle should have a right of way, whether one of the self-driving vehicle and the neighbor vehicle should yield, or whether one or both of the vehicles should replan its path.

According to some embodiments, there are three possible determinations that can be made with respect to a particular vehicle: that the vehicle has a right of way; that the vehicle should yield; and the that vehicle should replan its path. According to some embodiments, there may be scenarios (e.g. the scenario 1400) when both vehicles are "head on" with each other, in which it is illogical for a particular vehicle to have the right of way or to yield; in which case, it may be necessary for the vehicle to replan its path. For example, if the only means of yielding is for a vehicle to reduce its speed along its planned path, and if the two vehicles are "head on" with each other, then merely reducing the speed of one or both vehicles will not be sufficient to avoid a collision.

The determination 448a means that the self-driving vehicle is "head on" in the path of the neighbor vehicle. According to some embodiments, the self-driving vehicle may associate itself with a right-of-way status, and the neighbor vehicle with a yield status.

Conversely to 448a, the determination 448b means that the neighbor vehicle is "head on" in the path of the self-driving vehicle. According to some embodiments, the self-driving vehicle may associate itself with a yield status, and the neighbor vehicle with a right-of-way status.

The determination 448c means that both vehicles are "head on" with each other. According to some embodiments, the self-driving vehicle and/or the neighbor vehicle may have to replan their paths, since merely yielding may not avoid a collision.

According to some embodiments, the method 1100 may pass from the step 446d to the step 450 in order to perform further analysis towards making a right-of-way determination. For example, if each vehicle is approaching the other from the side (i.e. not "head on"), then further rules may be required.

At the step 450, the convergence angles are compared to a symmetry threshold. According to some embodiments, the symmetry threshold may be the same as the clearance threshold previously described (i.e. in FIG. 11, it is possible that $\alpha=\beta$). In particular, the difference between the two convergence angles is taken, and this difference is compared to the symmetry threshold. As will be now be appreciable by a person having skill in the art, the algebraic expressions $|\theta_A-\theta_B|\leq\beta$ is provided for ease of explanation, and various changes to this algebraic expression may be necessary depending on how each of the convergence angles are measured, and how the symmetry threshold $\beta$ is selected. Generally, this algebraic expression, vis-à-vis the symmetry threshold $\beta$ can be seen as a way of analyzing the degree to which the shape of the scenario 1500 resembles an isosceles triangle (meaning $\theta_A$ and $\theta_B$ are the same size).

If, at the step 450, it is determined that the convergence angles of the two vehicles are similar (i.e. that the difference between the convergence angle of the self-driving vehicle and the convergence angle of the neighbor vehicle are less than or equal to the symmetry threshold), then the method 1100 proceeds through the step 452a to the step 454a.

At step the 454a, a determination is made as to which vehicle—the self-driving vehicle or the neighbor vehicle— is approaching the other vehicle from the left. According to some embodiments, the previous performance of the precedent steps (e.g. as previously described for the methods 1100, the method 600, and the method 400) logically require that one vehicle must be approaching from the left while the other is approaching from the right.

According to some embodiments, the determination at the step 454a can be made by analyzing the convergence angles of each vehicle relative to the other (as measured through 360 degrees), and/or by determining the location of each of the vehicles relative to the electronic map. According to some embodiments, one approach direction—either left or right—may be chosen as the reference direction for determining right of way. For example, arbitrary and universal rules may be designed such that the vehicle approaching from the right has the right of way and that the vehicle approaching from the left must yield; and vice versa.

According to some embodiments, if, at the step 454a, the self-driving vehicle determines that the neighbor vehicle is approaching from the right (i.e. not from the left), then the method proceeds to the determination 456a, such that the self-driving vehicle associates itself with a right-of-way status, and associates the neighbor vehicle with a yield status. Conversely, if, at the step 454a, the self-driving vehicle determines that the neighbor vehicle is approaching from the left, then the method proceeds to the determination 458b, such that the self-driving vehicle associates itself with a yield status, and associates the neighbor vehicle with a right-of-way status.

Figure 16:
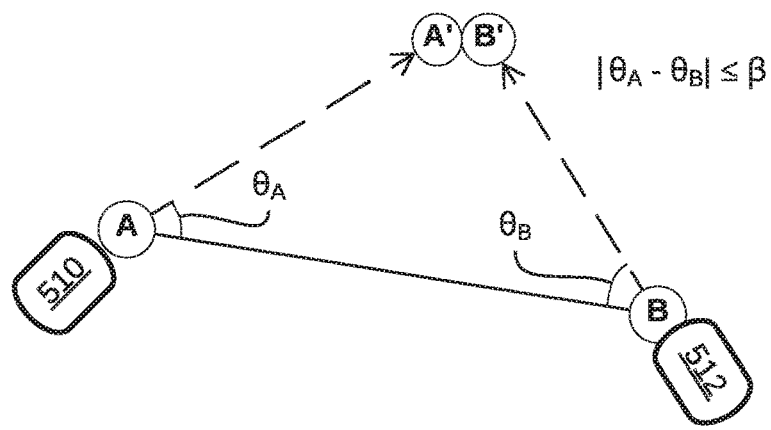
FIG. 16 is a plan view diagram depicting two vehicles converging at similar angles, according to at least one embodiment.

Referring to FIG. 16, there is shown an example scenario 1600 in which the self-driving vehicle 510 and the neighbor vehicle 512 are approaching each other with similar convergence angles, as indicated by the expression $|\theta_A-\theta_B|\leq\beta$. According to some embodiments, in the scenario 1600, the neighbor vehicle 512 has the right of way, and the self-driving vehicle 510 must yield, since the neighbor vehicle is approaching from the right.

Referring back to FIG. 11, if, at the step 450, it is determined that the convergence angles of the two vehicles are not similar (i.e. that the difference between the convergence angle of the self-driving vehicle and the convergence angle of the neighbor vehicle are greater than the symmetry threshold), then the method 1100 proceeds through the step 452b to the step 454b.

At the step 454b, a determination is made as to which vehicle—the self-driving vehicle or the neighbor vehicle— is passing above the other vehicle. According to some embodiment, the previous performance of the precedent steps (e.g. as previously described for the methods 1100, the method 600, and the method 400) logically require that one vehicle must be passing above while the other is passing below.

According to some embodiments, the determination at the step 454b can be made by analyzing the convergence angles of each vehicle relative to the other (as measured through 360 degrees), and/or by determining the location of each of the vehicles relative to the electronic map. According to some embodiments, one position—either above or below— may be chosen as the reference for determining right of way. For example, arbitrary and universal rules may be designed such that the vehicle passing above has the right of way and that the vehicle passing below must yield; and vice versa.

According to some embodiments, if, at the step 454b, the self-driving vehicle determines that the neighbor vehicle is passing below (i.e. not above), then the method proceeds to the determination 456a, such that the self-driving vehicle associates itself with a right-of-way status, and associates the neighbor vehicle with a yield status. Conversely, if, at the step 454b, the self-driving vehicle determines that the neighbor vehicle is passing above, then the method proceeds to the determination 458b, such that the self-driving vehicle associates itself with a yield status, and associates the neighbor vehicle with a right-of-way status.

Figure 17:
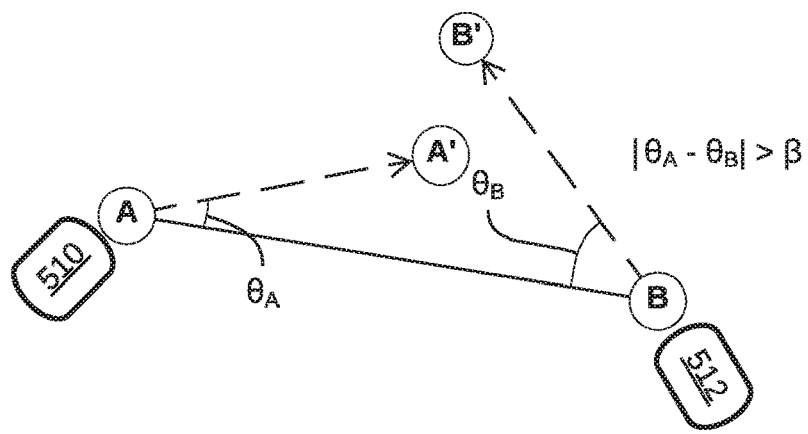
FIG. 17 is a plan view diagram depicting two vehicles converging at substantially different angles, according to at least one embodiment.

Referring to FIG. 17, there is shown an example scenario 1700 in which the self-driving vehicle 510 and the neighbor vehicle 512 have substantially different convergence angles, as indicated by the expression $|\theta_A - \theta_B| > \beta$. According to some embodiments, in the scenario 1700, the neighbor vehicle 512 has the right of way, and the self-driving vehicle 512 must yield, since the neighbor vehicle is passing above the self-driving vehicle.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

The terms "greater than" and "less than (or equal to)" are used to indicate two mutually-exclusive options. That is, there is no third option for "equal to". The terms "greater than (or equal to)" and "less than" may be used interchangeable with "greater than" and "less than (or equal to)"; and/or the term " . . . (or equal to)" may be omitted for convenience.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, a wireless device or any other computing device capable of being configured to carry out the methods described herein.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

We claim:

1. A method for self-driving vehicle traffic management, comprising:
  moving a self-driving vehicle along a path at a first speed;
  detecting a neighbor vehicle with the self-driving vehicle;
  using at least one processor of the self-driving vehicle to:
    determine a current position and an intent position associated with the neighbor vehicle;
    determine a current position and an intent position associated with the self-driving vehicle;
    determine an intent spacing based on the intent position of the neighbor vehicle and the intent position of the self-driving vehicle;
    compare the intent spacing to a distance threshold; and
    based on determining that the intent spacing is less than (or equal to) the distance threshold, associate a right-of-way status with one of the self-driving vehicle and the neighbor vehicle, and assigning a yield status to the other of the self-driving vehicle and the neighbor vehicle;
  such that, when the self-driving vehicle is associated with the yield status, the self-driving vehicle is moved along the path at a second speed that is slower than the first speed in response to being associated with the yield status.

2. The method of claim 1, further comprising using the at least one processor to:
  determine a current spacing based on the current position of the self-driving vehicle and the current position of the neighbor vehicle;

determine a relative spacing of the self-driving vehicle based on the intent position of the self-driving vehicle and the current position of the neighbor vehicle;

determine a relative spacing of the neighbor vehicle based on the current position of the self-driving vehicle and the intent position of the neighbor vehicle; and determine the right-of-way status and the yield status based on at least one of the current spacing, the relative spacing of the self-driving vehicle, and the relative spacing of the neighbor vehicle.

3. The method of claim 2, further comprising using the at least one processor to:

compare the relative spacing of the self-driving vehicle to the current spacing and determine that the relative spacing of the self-driving vehicle is greater than the current spacing; and compare the relative spacing of the neighbor vehicle to the current spacing and determine that the relative spacing of the neighbor vehicle is less than (or equal to) the current spacing;

wherein using the at least on processor to assign the right-of-way status and the yield status comprises assigning the right-of-way status to the self-driving vehicle and assigning the yield status to the neighbor vehicle.

4. The method of claim 2, further comprising using the at least one processor to:

compare the relative spacing of the self-driving vehicle to the current spacing and determine that the relative spacing of the self-driving vehicle is less than (or equal to) the current spacing; and compare the relative spacing of the neighbor vehicle to the current spacing and determine that the relative spacing of the neighbor vehicle is greater than the current spacing;

wherein using the at least on processor to assign the right-of-way status and the yield status comprises assigning the yield status to the self-driving vehicle and assigning the right-of-way status to the neighbor vehicle.

5. The method of claim 2, further comprising using the at least one processor to:

compare the relative spacing of the self-driving vehicle to the current spacing and determine that the relative spacing of the self-driving vehicle is less than (or equal to) the current spacing;

compare the relative spacing of the neighbor vehicle to the current spacing and determine that the relative spacing of the neighbor vehicle is less than (or equal to) the current spacing;

determine a convergence angle of self-driving vehicle based on the current position of the self-driving vehicle, the intent position of the self-driving vehicle, and the current position of the neighbor vehicle; and determine a convergence angle of the neighbor vehicle based on the current position of the self-driving vehicle, the current position of the neighbor vehicle, and the intent position of the neighbor vehicle;

wherein using the at least on processor to assign the right-of-way status and the yield status is based on at least one of the convergence angle of the self-driving vehicle and the convergence angle of the neighbor vehicle.

6. The method of claim 5, further comprising using the at least one processor to:

compare the convergence angle of the self-driving vehicle to a clearance threshold and determine that the convergence angle of the self-driving vehicle is greater than the clearance threshold; and compare the convergence angle of the neighbor vehicle to the clearance angle threshold and determine that the convergence angle of the neighbor vehicle is less than (or equal to) the clearance threshold;

wherein using the at least on processor to assign the right-of-way status and the yield status comprises assigning the right-of-way status to the self-driving vehicle and assigning the yield status to the neighbor vehicle.

7. The method of claim 5, further comprising using the at least one processor to:

compare the convergence angle of the self-driving vehicle to a clearance threshold and determine that the convergence angle of the self-driving vehicle is less than (or equal to) the clearance threshold; and compare the convergence angle of the neighbor vehicle to the clearance angle threshold and determine that the convergence angle of the neighbor vehicle is greater than the clearance threshold;

wherein using the at least on processor to assign the right-of-way status and the yield status comprises assigning the yield status to the self-driving vehicle and assigning the right-of-way status to the neighbor vehicle.

8. The method of claim 5, further comprising using the at least one processor to:

compare the convergence angle of the self-driving vehicle to a clearance threshold and determine that the convergence angle of the self-driving vehicle is greater than the clearance threshold;

compare the convergence angle of the neighbor vehicle to the clearance angle threshold and determine that the convergence angle of the neighbor vehicle is greater than the clearance threshold;

compare a difference between the convergence angle of the self-driving vehicle and the convergence angle of the neighbor vehicle to a symmetry threshold and determine that the difference is less than (or equal to) the symmetry threshold;

determine that the self-driving vehicle is approaching the neighbor vehicle from a left position based on the current position of the self-driving vehicle and the current position of the neighbor vehicle; and wherein using the at least on processor to assign the right-of-way status and the yield status comprises assigning the right-of-way status to the self-driving vehicle and assigning the yield status to the neighbor vehicle.

9. The method of claim 5, further comprising using the at least one processor to:

compare the convergence angle of the self-driving vehicle to a clearance threshold and determine that the convergence angle of the self-driving vehicle is greater than the clearance threshold;

compare the convergence angle of the neighbor vehicle to the clearance angle threshold and determine that the convergence angle of the neighbor vehicle is greater than the clearance threshold;

compare a difference between the convergence angle of the self-driving vehicle and the convergence angle of the neighbor vehicle to a symmetry threshold and determine that the difference is less than (or equal to) the symmetry threshold;

determine that the self-driving vehicle is approaching the neighbor vehicle from a right position based on the current position of the self-driving vehicle and the current position of the neighbor vehicle; and wherein using the at least on processor to assign the right-of-way status and the yield status comprises assigning the yield status to the self-driving vehicle and assigning the right-of-way status to the neighbor vehicle.

10. The method of claim 5, further comprising using the at least one processor to:
compare the convergence angle of the self-driving vehicle to a clearance threshold and determine that the convergence angle of the self-driving vehicle is greater than the clearance threshold;
compare the convergence angle of the neighbor vehicle to the clearance angle threshold and determine that the convergence angle of the neighbor vehicle is greater than the clearance threshold;
compare a difference between the convergence angle of the self-driving vehicle and the convergence angle of the neighbor vehicle to a symmetry threshold and determine that the difference is less than (or equal to) the symmetry threshold;
determine that the self-driving vehicle is approaching the neighbor vehicle from a left position based on the current position of the self-driving vehicle and the current position of the neighbor vehicle; and
wherein using the at least on processor to assign the right-of-way status and the yield status comprises assigning the yield status to the self-driving vehicle and assigning the right-of-way status to the neighbor vehicle.

11. The method of claim 5, further comprising using the at least one processor to:
compare the convergence angle of the self-driving vehicle to a clearance threshold and determine that the convergence angle of the self-driving vehicle is greater than the clearance threshold;
compare the convergence angle of the neighbor vehicle to the clearance angle threshold and determine that the convergence angle of the neighbor vehicle is greater than the clearance threshold;
compare a difference between the convergence angle of the self-driving vehicle and the convergence angle of the neighbor vehicle to a symmetry threshold and determine that the difference is less than (or equal to) the symmetry threshold;
determine that the self-driving vehicle is approaching the neighbor vehicle from a right position based on the current position of the self-driving vehicle and the current position of the neighbor vehicle; and
wherein using the at least on processor to assign the right-of-way status and the yield status comprises assigning the right-of-way status to the self-driving vehicle and assigning the yield status to the neighbor vehicle.

12. The method of claim 5, further comprising using the at least one processor to:
compare the convergence angle of the self-driving vehicle to a clearance threshold and determine that the convergence angle of the self-driving vehicle is greater than the clearance threshold;
compare the convergence angle of the neighbor vehicle to the clearance angle threshold and determine that the convergence angle of the neighbor vehicle is greater than the clearance threshold;
compare a difference between the convergence angle of the self-driving vehicle and the convergence angle of the neighbor vehicle to a symmetry threshold and determine that the difference is greater than the symmetry threshold;
determine that the self-driving vehicle is approaching the neighbor vehicle from a position above a position of the neighbor vehicle based on the current position of the self-driving vehicle and the current position of the neighbor vehicle; and
wherein using the at least on processor to assign the right-of-way status and the yield status comprises assigning the right-of-way status to the self-driving vehicle and assigning the yield status to the neighbor vehicle.

13. The method of claim 5, further comprising using the at least one processor to:
compare the convergence angle of the self-driving vehicle to a clearance threshold and determine that the convergence angle of the self-driving vehicle is greater than the clearance threshold;
compare the convergence angle of the neighbor vehicle to the clearance angle threshold and determine that the convergence angle of the neighbor vehicle is greater than the clearance threshold;
compare a difference between the convergence angle of the self-driving vehicle and the convergence angle of the neighbor vehicle to a symmetry threshold and determine that the difference is greater than the symmetry threshold;
determine that the self-driving vehicle is approaching the neighbor vehicle from a position below a position of the neighbor vehicle based on the current position of the self-driving vehicle and the current position of the neighbor vehicle; and
wherein using the at least on processor to assign the right-of-way status and the yield status comprises assigning the yield status to the self-driving vehicle and assigning the right-of-way status to the neighbor vehicle.

14. The method of claim 5, further comprising using the at least one processor to:
compare the convergence angle of the self-driving vehicle to a clearance threshold and determine that the convergence angle of the self-driving vehicle is greater than the clearance threshold;
compare the convergence angle of the neighbor vehicle to the clearance angle threshold and determine that the convergence angle of the neighbor vehicle is greater than the clearance threshold;
compare a difference between the convergence angle of the self-driving vehicle and the convergence angle of the neighbor vehicle to a symmetry threshold and determine that the difference is greater than the symmetry threshold;
determine that the self-driving vehicle is approaching the neighbor vehicle from a position below a position of the neighbor vehicle based on the current position of the self-driving vehicle and the current position of the neighbor vehicle; and
wherein using the at least on processor to assign the right-of-way status and the yield status comprises assigning the right-of-way status to the self-driving vehicle and assigning the yield status to the neighbor vehicle.

15. The method of claim 5, further comprising using the at least one processor to:

compare the convergence angle of the self-driving vehicle to a clearance threshold and determine that the convergence angle of the self-driving vehicle is greater than the clearance threshold;

compare the convergence angle of the neighbor vehicle to the clearance angle threshold and determine that the convergence angle of the neighbor vehicle is greater than the clearance threshold;

compare a difference between the convergence angle of the self-driving vehicle and the convergence angle of the neighbor vehicle to a symmetry threshold and determine that the difference is greater than the symmetry threshold;

determine that the self-driving vehicle is approaching the neighbor vehicle from a position above a position of the neighbor vehicle based on the current position of the self-driving vehicle and the current position of the neighbor vehicle; and wherein using the at least on processor to assign the right-of-way status and the yield status comprises assigning the yield status to the self-driving vehicle and assigning the right-of-way status to the neighbor vehicle.

16. The method of claim 1, wherein detecting the neighbor vehicle with the self-driving vehicle comprises using one or more sensors of the self-driving vehicle to obtain a first position of the neighbor vehicle at a first time and a second position of the neighbor vehicle at a second time;

wherein using the at least one processor of the self-driving vehicle to determine the current position and the intent position associated with the neighbor vehicle is based on the first position and the second position.

17. The method of claim 1, wherein detecting the neighbor vehicle with the self-driving vehicle comprises receiving, using the self-driving vehicle, position data and velocity intent data associated with the neighbor vehicle;

wherein using the at least one processor of the self-driving vehicle to determine the current position and the intent position associated with the neighbor vehicle is based on the position data and velocity intent data associated with the neighbor vehicle.

18. A system for self-driving vehicle traffic management, comprising a self-driving vehicle having a sensor system, a control system, and a drive system;

the control system configured to:
  determine a current position and an intent position associated with the self-driving vehicle;
  receive a current position and an intent position associated with a neighbor vehicle;
  determine a current spacing based on the current position of the self-driving vehicle and the current position of the neighbor vehicle;
  determine a relative spacing of the self-driving vehicle based on the intent position of the self-driving vehicle and the current position of the neighbor vehicle;
  determine a relative spacing of the neighbor vehicle based on the current position of the self-driving vehicle and the intent position of the neighbor vehicle; and
generate a yield signal based on at least one of the current position of the self-driving vehicle, the intent position of the self-driving vehicle, the current position of the neighbor vehicle, the intent position of the neighbor vehicle, the current spacing, the relative spacing of the self-driving vehicle, and the relative spacing of the neighbor vehicle; and
the drive system configured to receive the yield signal and vary a speed of the self-driving vehicle in response to the yield signal.

19. The system of claim 18, further comprising:

a communication network for facilitating communications between the self-driving vehicle and the neighbor vehicle;

wherein the control system of the self-driving vehicle configured to receive the current position and the intent position associated with the neighbor vehicle comprises the control system configured to receive position and velocity data transmitted by the neighbor vehicle via the communication network.

20. The system of claim 19, further comprising:

a fleet management system in communication with the communication network and each of the self-driving vehicle and the neighbor vehicle;

wherein the control system configured to receive position and velocity data transmitted by the neighbor vehicle via the communication network comprises the control system configured to receive position and velocity transmitted by the neighbor vehicle via the fleet management system.

* * * * *